United States Patent
Li

(10) Patent No.: US 11,489,550 B2
(45) Date of Patent: Nov. 1, 2022

(54) FILTERING METHOD AND APPARATUS

(71) Applicant: HUAWEI TECHNOLOGIES CO., LTD., Shenzhen (CN)

(72) Inventor: Haibo Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/343,097

(22) Filed: Jun. 9, 2021

(65) Prior Publication Data

US 2021/0297099 A1   Sep. 23, 2021

Related U.S. Application Data

(63) Continuation of application No. PCT/CN2018/120983, filed on Dec. 13, 2018.

(51) Int. Cl.
*H04B 1/10* (2006.01)

(52) U.S. Cl.
CPC ..................... *H04B 1/10* (2013.01)

(58) Field of Classification Search
CPC ........ H04B 1/10; H04B 1/123; H04B 1/0475; H04B 1/71; H04B 1/7101; H04B 1/7097; H04B 1/1027; H04B 1/1036; H04B 2001/1045; H04B 2001/1054; H04B 2001/1072

See application file for complete search history.

(56) References Cited

U.S. PATENT DOCUMENTS

| | | | |
|---|---|---|---|
| 6,718,166 B2 * | 4/2004 | Cordone | H04B 1/123 455/67.11 |
| 8,774,293 B2 * | 7/2014 | Berlotserkovsky | H04B 1/0003 375/225 |
| 10,784,908 B2 * | 9/2020 | Tracht | H04B 1/10 |

(Continued)

FOREIGN PATENT DOCUMENTS

| | | |
|---|---|---|
| CN | 101098396 A | 1/2008 |
| CN | 101841644 A | 9/2010 |

(Continued)

OTHER PUBLICATIONS

Extended European Search Report issued in corresponding European Application No. 18942899.8, dated Nov. 2, 2021, pp. 1-11, European Patent Office, Munich, Germany.

(Continued)

*Primary Examiner* — Quochien B Vuong
(74) *Attorney, Agent, or Firm* — Hauptman Ham, LLP

(57) ABSTRACT

A filtering method and apparatus are provided, and the method includes: performing spectrum shifting on a first signal to obtain a second signal, where the first signal includes a first valid signal band and a first to-be-suppressed signal band, a demarcation point of the first valid signal band and the first to-be-suppressed signal band in the first signal is a first boundary point, the first boundary point corresponds to a second boundary point in the second signal, a frequency of the second boundary point is equal to a frequency of a first side frequency point of the filter, and a frequency range corresponding to the first valid signal band in the second signal falls within a frequency range corresponding to a passband of the filter (S301); and filtering the second signal by using the filter, to obtain the first valid signal band (S302).

16 Claims, 15 Drawing Sheets

(56) References Cited

U.S. PATENT DOCUMENTS

| | | |
|---|---|---|
| 2005/0273482 A1 | 12/2005 | Moore |
| 2014/0105203 A1 | 4/2014 | Johansson et al. |
| 2016/0315368 A1 | 10/2016 | Liang et al. |
| 2018/0278441 A1 | 9/2018 | Ross et al. |

FOREIGN PATENT DOCUMENTS

| | | | | |
|---|---|---|---|---|
| CN | 102148790 A | 8/2011 | | |
| CN | 102308483 A | 1/2012 | | |
| CN | 103475384 A | 12/2013 | | |
| CN | 105591656 A | 5/2016 | | |
| CN | 105634539 A | 6/2016 | | |
| CN | 108183879 A | 6/2018 | | |
| EP | 0844735 A2 | 5/1998 | | |
| RU | 2304346 C2 * | 8/2007 | ........... | H04B 1/1036 |

OTHER PUBLICATIONS

International Search Report issued in corresponding International Application No. PCT/CN2018/120983, dated Sep. 12, 2019, pp. 1-9.

Chinese Office Action issued in corresponding Chinese Application No. 201880099940.7, dated Mar. 15, 2022, pp. 1-11.

* cited by examiner

FILTERING METHOD AND APPARATUS

CROSS-REFERENCE TO RELATED APPLICATIONS

This application is a continuation of International Application No. PCT/CN2018/120983, filed on Dec. 13, 2018, the disclosure of which is hereby incorporated by reference in its entirety.

TECHNICAL FIELD

This application relates to the signal processing field, and in particular, to a filtering method and apparatus.

BACKGROUND

A filter is a component used to separate signals of different frequencies. A main function of the filter is to suppress an unwanted signal, so that the unwanted signal cannot pass through the filter, and a useful signal passes through the filter. Filters may be classified into a low-pass filter, a high-pass filter, a band-pass filter, and a band-stop filter based on functions.

The filter may be applied to a wireless communications system, and the filter may be configured to filter signals such as a baseband signal and an intermediate radio frequency signal to obtain a signal whose bandwidth matches bandwidth of a communications channel in the wireless communications system, in other words, to obtain a signal whose valid signal bandwidth is equal to transmission bandwidth of the communications channel. To flexibly use scattered spectrum resources, in a current communications system, a plurality of communications channels of different bandwidth are designed, to adapt to spectrum resources with different widths, and fully use the spectrum resources. Because there are a plurality of communications channels of different bandwidth in the wireless communications system, there are also a plurality of signals of different bandwidth in the wireless communications system. In a current design, a filter that matches bandwidth of a signal is usually designed to filter the signal, to obtain a signal that matches the bandwidth of the communications channel in the wireless communications system. A problem caused in this case is: For a plurality of signals of different bandwidth, a plurality of filters corresponding to the bandwidth of the signals need to be separately designed for the signals, and then, each filter is designed and developed. This consumes manpower and material resources.

SUMMARY

This application provides a filtering method and apparatus, to resolve a problem that different filters need to be separately designed and developed for signals of different bandwidth, so that the filtering apparatus provided in this application can filter the signals of different bandwidth.

According to a first aspect, a filtering method is provided and may be applied to a network device or a terminal device, and includes: performing spectrum shifting on a first signal to obtain a second signal, where the first signal includes a first valid signal band and a first to-be-suppressed signal band, a demarcation point of the first valid signal band and the first to-be-suppressed signal band in the first signal is a first boundary point, the first boundary point corresponds to a second boundary point in the second signal, a frequency of the second boundary point is equal to a frequency of a first side frequency point of a filter, and a frequency range corresponding to the first valid signal band in the second signal falls within a frequency range corresponding to a passband of the filter; and filtering the second signal by using the filter, to obtain the first valid signal band.

In this technical solution, first, spectrum shifting is performed on the first signal to obtain the second signal, where the second boundary point in the second signal corresponds to the first boundary point in the first signal, the first boundary point is the demarcation point of the first valid signal band and the first to-be-suppressed signal band, the frequency of the second boundary point is equal to the frequency of the first side frequency point of the filter, and the frequency range corresponding to the first valid signal band in the second signal falls within the frequency range corresponding to the passband of the filter. This indicates that a boundary of the first valid signal band in the second signal is aligned with a side frequency point of the filter, the first valid signal band is within the passband of the filter, and the first to-be-suppressed signal band is not within the passband of the filter. The second signal is filtered by using the filter, so that the first to-be-suppressed signal band is suppressed, and the first valid signal band is obtained. In other words, first, spectrum shifting is performed, so that the boundary of the first valid signal band is aligned with the side frequency point of the filter, and then, the filter performs filtering, so that an unwanted signal can be suppressed, and any valid signal band less than or equal to the passband bandwidth of the filter is retained. Therefore, the filter has versatility, and there is no need to design and develop a corresponding filter for a signal to be obtained through filtering, thereby saving manpower and material resources.

With reference to the first aspect, in a first possible case, there is a to-be-suppressed signal band that needs to be suppressed on either side of a valid signal band to be obtained through filtering, and before the performing spectrum shifting on a first signal to obtain a second signal, the method further includes: performing spectrum shifting on a third signal to obtain a fourth signal, where the third signal includes a second to-be-suppressed signal band and the first signal, a demarcation point of the second to-be-suppressed signal band and the first signal in the third signal is a third boundary point, the third boundary point is also a demarcation point of the second to-be-suppressed signal band and the first valid signal band, the third boundary point corresponds to a fourth boundary point in the fourth signal, a frequency of the fourth boundary point is equal to a frequency of a second side frequency point of the filter, and the second side frequency point is not the first side frequency point; and filtering the fourth signal by using the filter, to obtain the first signal. In this solution, an invalid signal band on a side of a valid signal band that is less than the passband bandwidth of the filter can be suppressed.

With reference to the first possible case of the first aspect, in a second possible case, the third signal is a baseband signal, valid signal bandwidth of the baseband signal is equal to bandwidth of the first valid signal band, the frequency of the second side frequency point is on a first side of a first frequency in frequency domain, and the first frequency is a frequency of the third boundary point; and an implementation of the performing spectrum shifting on a third signal to obtain a fourth signal is: performing spectrum shifting on the baseband signal along a first side of the baseband signal based on a first offset to obtain the fourth signal, where the first offset is calculated based on a first formula, and the first formula is:

$$O1 = \begin{cases} \left|f0 - \frac{A}{2} - F1\right|, & f1 > f2 \\ \left|f0 + \frac{A}{2} - F2\right|, & f1 < f2 \end{cases},$$

where O1 is the first offset, f0 is a frequency of a center frequency point of a valid signal in the baseband signal, A is the valid signal bandwidth of the baseband signal, F1 is a frequency of a left side frequency point of the filter, F2 is a frequency of a right side frequency point of the filter, f1 is a frequency of the first boundary point, and f2 is the frequency of the third boundary point.

With reference to the second possible case of the first aspect, in a third possible case, the frequency of the first side frequency point is on a second side of a second frequency in frequency domain, and the second frequency is the frequency of the first boundary point; and an implementation of the performing spectrum shifting on a first signal to obtain a second signal is: performing spectrum shifting on the first signal along a second side of the first signal based on a second offset to obtain the second signal, where the second offset is calculated based on a second formula, the second formula is O2=|B−A|, O2 is the second offset, and B is the passband bandwidth of the filter.

In the implementations in the foregoing several possible cases, different filters can obtain, through filtering, any valid signal band whose bandwidth is less than or equal to the passband bandwidth of the filter, thereby ensuring that in all cases, any valid signal band whose bandwidth is less than the passband bandwidth of the filter can be obtained through filtering.

With reference to the first aspect, in a fourth possible case, bandwidth of a valid signal band to be obtained through filtering is greater than the passband bandwidth of the filter, and the method further includes: using a fifth boundary point of an $(n-i)^{th}$ signal and a boundary point of the $(n-i)^{th}$ signal as boundary points of a first signal band, and when bandwidth of a valid signal band in the first signal band is greater than the passband bandwidth of the filter, performing spectrum shifting on the $(n-i)^{th}$ signal to obtain an $(n+1)^{th}$ signal, where the $(n-i)^{th}$ signal includes a third to-be-suppressed signal band and a third valid signal band, the third to-be-suppressed signal band and the first signal band are separately on two sides of the fifth boundary point in the $(n-i)^{th}$ signal, a demarcation point of the third to-be-suppressed signal band and the third valid signal band in the $(n-i)^{th}$ signal is a sixth boundary point, a frequency interval between the fifth boundary point and the sixth boundary point is $(n-1) \times B$, B is the passband bandwidth of the filter, the fifth boundary point corresponds to a seventh boundary point in the $(n+1)^{th}$ signal, a frequency of the seventh boundary point is equal to a frequency of a third side frequency point of the filter, and the third side frequency point is the first side frequency point or the second side frequency point, where n is a positive integer, i is any integer greater than or equal to 0 and less than n, and when a value of n is 1, the $(n-i)^{th}$ signal is a fifth signal; and filtering the $(n+1)^{th}$ signal by using the filter, to obtain an $n^{th}$ second valid signal band, and using (n+1) as n to perform the step of using a fifth boundary point of an $(n-i)^{th}$ signal and a boundary point of the $(n-i)^{th}$ signal as boundary points of a first signal band; or when the bandwidth of the valid signal band in the first signal band is less than or equal to the passband bandwidth of the filter, if the $(n-i)^{th}$ signal further includes a fourth to-be-suppressed signal band, determining that the $(n-i)^{th}$ signal is the third signal, determining that the fifth boundary point or an eighth boundary point is the third boundary point, and performing the step of performing spectrum shifting on a third signal to obtain a fourth signal, where the fourth to-be-suppressed signal band and the third to-be-suppressed signal band are on two sides of the third valid signal band in the $(n-i)^{th}$ signal, and a demarcation point of the fourth to-be-suppressed signal band and the third to-be-suppressed signal in the $(n-i)^{th}$ signal is the eighth boundary point; or if the $(n-i)^{th}$ signal does not include the fourth to-be-suppressed signal, determining that the $(n-i)^{th}$ signal is the first signal, determining that the fifth boundary point is the first boundary point, and performing the step of performing spectrum shifting on a first signal to obtain a second signal; and after the filtering the second signal by using the filter, to obtain the first valid signal band, the method further includes: determining the third valid signal band based on the first valid signal band and the second valid signal band.

Herein, when the fifth signal further includes the fourth to-be-suppressed signal band, the third side frequency point is the first side frequency point; and when the fifth signal does not include the fourth to-be-suppressed signal band, if the third side frequency point is the first side frequency point, the eighth boundary point is determined as the first boundary point, and if the third side frequency point is the second side frequency point, the fifth boundary point is determined as the third boundary point.

With reference to the fourth possible case of the first aspect, in a possible implementation, the determining the third valid signal band based on the first valid signal band and the second valid signal band includes: if the second valid signal band is not obtained, determining the first valid signal band as the third valid signal band; or if the second valid signal band is obtained, performing signal splicing on the first valid signal band and the second valid signal band to obtain the third valid signal band. A plurality of second valid signals bands whose bandwidth is equal to that of the filter are sequentially obtained through filtering, and then signal splicing is performed on the second valid signal bands obtained through filtering and the first valid signal band obtained through filtering, to obtain a valid signal band whose bandwidth is greater than that of the filter, so that the filter has versatility.

With reference to the fourth possible case of the first aspect, in a fifth possible case, the fifth signal is a baseband signal, valid signal bandwidth of the baseband signal is equal to bandwidth of the third valid signal band, the third to-be-suppressed signal band is on a left side of the sixth boundary point in the $(n-i)^{th}$ signal, a frequency of the third side frequency point is on a third side of a third frequency in frequency domain, and the third frequency is a frequency corresponding to the fifth boundary point in the $(n-i)^{th}$ signal; and an implementation of the performing spectrum shifting on the $(n-i)^{th}$ signal to obtain an $(n+1)^{th}$ signal is: performing spectrum shifting on the $(n-i)^{th}$ signal along a third side of the $(n-i)^{th}$ signal based on a third offset to obtain the $(n+1)^{th}$ signal, where the third offset is calculated based on a third formula, and the third formula is:

$$O3 = \begin{cases} \left|f0 - \frac{A}{2} + (n-1) \times B - F1\right|, & (n-i) = 1 \\ (i+1) \times B, & (n-i) > 1 \end{cases},$$

where O3 is the third offset, f0 is a frequency of a center frequency point of a valid signal in the baseband signal, A is the valid signal bandwidth of the baseband signal, and F1 is a frequency of a left side frequency point of the filter.

With reference to the fifth possible case of the first aspect, when it is determined that the $(n-i)^{th}$ signal is the third signal, the frequency of the second side frequency point is on a first side of a first frequency in frequency domain, and the first frequency is a frequency of the third boundary point; and a possible implementation of the performing spectrum shifting on a third signal to obtain a fourth signal is: when it is determined that the fifth boundary point is the third boundary point, performing spectrum shifting on the third signal along a first side of the third signal based on a fourth offset to obtain the fourth signal, where the fourth offset is calculated based on a fourth formula, and the fourth formula is:

$$O4 = \begin{cases} \left|f0 - \frac{A}{2} + (n-1) \times B - F1\right|, (n-i) = 1 \\ (i+1) \times B, (n-i) > 1 \end{cases},$$

where O4 is the fourth offset.

Another possible implementation of the performing spectrum shifting on a third signal to obtain a fourth signal is: when it is determined that the eighth boundary point is the third boundary point, performing spectrum shifting on the third signal along a first side of the third signal based on a fifth offset to obtain the fourth signal, where the fifth offset is calculated based on a fifth formula, and the fifth formula is:

$$O5 = \begin{cases} \left|f0 + \frac{A}{2} - F2\right|, (n-i) = 1 \\ A - (n-i-1) \times B, (n-i) > 1 \end{cases},$$

where O5 is the fifth offset, and F2 is a frequency of a right side frequency point of the filter.

With reference to the fifth possible case of the first aspect, when it is determined that the $(n-i)^{th}$ signal is the first signal, the frequency of the first side frequency point is on a second side of a second frequency in frequency domain, and the second frequency is a frequency of the first boundary point; and a possible implementation of the performing spectrum shifting on a first signal to obtain a second signal is: performing spectrum shifting on the first signal along a second side of the first signal based on an eleventh offset to obtain the second signal, where the eleventh offset is calculated based on an eleventh formula, and the eleventh formula is:

$$O11 = \begin{cases} \left|f0 - \frac{A}{2} + (n-1) \times B - F1\right|, (n-i) = 1 \\ (i+1) \times B, (n-i) > 1 \end{cases},$$

where O11 is the eleventh offset.

With reference to the fourth possible case of the first aspect, in a sixth possible case, the fifth signal is a baseband signal, the third to-be-suppressed signal band is on a right side of the sixth boundary point in the $(n-i)^{th}$ signal, the frequency of the third side frequency point is on a third side of a third frequency in frequency domain, and the third frequency is a frequency corresponding to the fifth boundary point in the $(n-i)^{th}$ signal; and an implementation of the performing spectrum shifting on the $(n-i)^{th}$ signal to obtain an $(n+1)^{th}$ signal is: performing spectrum shifting on the $(n-i)^{th}$ signal along a third side of the $(n-i)^{th}$ signal based on a sixth offset to obtain the $(n+1)^{th}$ signal, where the sixth offset is calculated based on a sixth formula, and the sixth formula is:

$$O6 = \begin{cases} \left|f0 + \frac{A}{2} - (n-1) \times B - F2\right|, (n-i) = 1 \\ (i+1) \times B, (n-i) > 1 \end{cases},$$

where O6 is the sixth offset, f0 is a frequency of a center frequency point of a valid signal in the baseband signal, A is valid signal bandwidth of the baseband signal, and F2 is a frequency of a right side frequency point of the filter.

With reference to the sixth possible case of the first aspect, when it is determined that the $(n-i)^{th}$ signal is the third signal, the frequency of the second side frequency point is on a first side of a first frequency in frequency domain, and the first frequency is a frequency of the third boundary point; and a possible implementation of the performing spectrum shifting on a third signal to obtain a fourth signal is: when it is determined that the fifth boundary point is the third boundary point, performing spectrum shifting on the third signal along a first side of the third signal based on a seventh offset to obtain the fourth signal, where the fourth offset is calculated based on a seventh formula, and the seventh formula is:

$$O7 = \begin{cases} \left|f0 + \frac{A}{2} - (n-1) \times B - F2\right|, (n-i) = 1 \\ (i+1) \times B, (n-i) > 1 \end{cases},$$

where O7 is the seventh offset. Another possible implementation of the performing spectrum shifting on a third signal to obtain a fourth signal is: when it is determined that the eighth boundary point is the third boundary point, performing spectrum shifting on the third signal along a first side of the third signal based on an eighth offset to obtain the fourth signal, where the eighth offset is calculated based on an eighth formula, and the eighth formula is:

$$O8 = \begin{cases} \left|f0 - \frac{A}{2} - F1\right|, (n-i) = 1 \\ A - (n-i-1) \times B, (n-i) > 1 \end{cases},$$

where O8 is the eighth offset, and F1 is a frequency of a left side frequency point of the filter.

With reference to the sixth possible case of the first aspect, when it is determined that the $(n-i)^{th}$ signal is the first signal, the frequency of the first side frequency point is on a second side of a second frequency in frequency domain, and the second frequency is a frequency of the first boundary point; and a possible implementation of the performing spectrum shifting on a first signal to obtain a second signal is: performing spectrum shifting on the first signal along a second side of the first signal based on a twelfth offset to obtain the second signal, where the twelfth offset is calculated based on a twelfth formula, and the twelfth formula is:

$$O12 = \begin{cases} \left| f0 + \dfrac{A}{2} - (n-1) \times B - F2 \right|, (n-i) = 1 \\ (i+1) \times B, (n-i) > 1 \end{cases},$$

where O12 is the twelfth offset.

With reference to the fifth possible case or the sixth possible case of the first aspect, when it is determined that the $(n-i)^{th}$ signal is the third signal, the frequency of the first side frequency point is on a second side of a second frequency in frequency domain, and the second frequency is a frequency corresponding to the first boundary point in the first signal; and an implementation of the performing spectrum shifting on a first signal to obtain a second signal is: performing spectrum shifting on the first signal along a second side of the first signal based on a ninth offset to obtain the second signal, where the ninth offset is calculated based on a ninth formula, the ninth formula is $O9=|n \times B - A|$, and O9 is the ninth offset.

In the implementations in the foregoing several possible cases, different filters can obtain, through filtering, any valid signal band whose bandwidth is greater than the passband bandwidth of the filter, thereby ensuring that in all cases, the valid signal band can be obtained through filtering, and the filter has versatility.

With reference to the fifth case or the sixth case of the first aspect, in a possible implementation, after the determining the third valid signal band based on the first valid signal band and the second valid signal band, the method further includes: performing spectrum shifting on the third valid signal band based on a fourth frequency and a fifth frequency to obtain a radio frequency signal corresponding to the baseband signal, where the fourth frequency is a frequency of a center frequency point of the radio frequency signal, and the fifth frequency is a frequency of a center frequency point of the third valid signal band. A signal to be sent to a communications channel can be obtained by shifting a center frequency point of the obtained valid signal band to the center frequency point of the radio frequency signal.

In the foregoing several cases, the filter may be any one of a low-pass filter, a band-pass filter, or a high-pass filter. If the filter is a low-pass filter, F1 is equal to 0, and F2 is equal to a cut-off frequency of the filter. If the filter is a band-pass filter, F1 is equal to a first cut-off frequency of the filter, F2 is equal to a second cut-off frequency of the filter, and the first cut-off frequency is less than the second cut-off frequency. If the filter is a high-pass filter, F1 is equal to a cut-off frequency of the filter, and F2 is equal to a sum of the cut-off frequency of the filter and the passband bandwidth of the filter.

With reference to the first aspect, in a possible implementation, the frequency of the first side frequency point is on a second side of a second frequency in frequency domain, and the second frequency is a frequency of the first boundary point, and the performing spectrum shifting on a first signal to obtain a second signal includes: performing spectrum shifting on the first signal along a second side of the first signal based on a tenth offset to obtain the second signal, where the tenth offset is calculated based on a tenth formula, the tenth formula is $O10=|f1-F3|$, O10 is the tenth offset, f1 is the frequency of the first boundary point, and F3 is the frequency of the first side frequency point. An offset is determined based on the frequency of the first side frequency point and the frequency of the first boundary point, so that a boundary of the first valid signal band can be aligned with the side frequency point of the filter, and the first valid signal band is within the passband of the filter.

With reference to the foregoing cases of the first aspect, in some possible implementations, the valid signal band to be obtained through filtering may further be considered as a combination of a plurality of valid signal segments whose bandwidth is less than or equal to the passband bandwidth of the filter, each valid signal segment is used as a signal to be obtained through filtering, a boundary point of each valid signal segment is aligned with the side frequency point of the filter, and then filtering is performed, to obtain each valid signal segment through filtering, and finally, the valid signal segments are spliced to obtain the valid signal band. Spectra of the plurality of valid signal segments may overlap each other or may not overlap each other, and the spectra of the plurality of valid signal segments are combined together to form a spectrum of the valid signal band to be obtained through filtering.

According to a second aspect, a filtering apparatus is provided, and is configured to perform the filtering method described in the first aspect. The filtering apparatus may include a memory and a signal processing component coupled to the memory, where the signal processing component includes a baseband signal processing chip and an intermediate radio frequency component, the memory is configured to store program code of the filtering method described in the first aspect, and the signal processing component is configured to execute the program code stored in the memory, in other words, perform the method provided in the first aspect or the method provided in any one of the possible cases of the first aspect.

According to a third aspect, another filtering apparatus is provided, where the apparatus may include a plurality of function modules, configured to correspondingly perform the method provided in the first aspect or the method in any one of the possible cases of the first aspect.

According to a fourth aspect, a computer-readable storage medium is provided. The computer-readable storage medium stores instructions, and when the instructions are run on a computer, the computer is enabled to perform the filtering method described in the first aspect.

According to a fifth aspect, a computer program product including instructions is provided, and when the instructions are run on a computer, the computer is enabled to perform the filtering method described in the first aspect.

When the technical solutions of this application are implemented, a filter can have versatility, and therefore, one filter can filter signals of different bandwidth, thereby saving manpower and material resources.

BRIEF DESCRIPTION OF DRAWINGS

FIG. 9A-1, FIG. 9A-2, and FIG. 9B are schematic diagrams of spectrum shifting and filtering according to an embodiment of this application;

DESCRIPTION OF EMBODIMENTS

The following describes the technical solutions in the embodiments of this application with reference to the accompanying drawings in the embodiments of this application.

Figure 1:
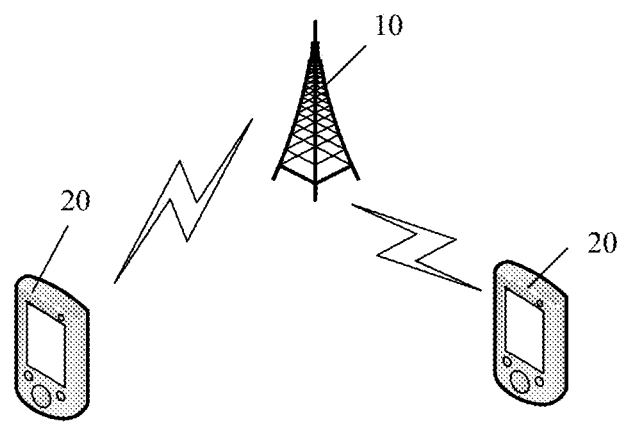
FIG. 1 is a schematic architectural diagram of a communications system according to this application.

The solutions in this application are applicable to a communications system in which there are communications channels and signals of different bandwidth. To facilitate understanding of the solutions of this application, an architecture of the communications system is described first. FIG. 1 is a schematic architectural diagram of a communications system according to this application. As shown in the figure, the communications system includes a network device 10 and a terminal device 20, and the network device 10 and the terminal device 20 communicate with each other by using a wireless communications channel. In a physical sense, the wireless communications channel is a frequency band of an electromagnetic wave. The network device 10 may add, to a carrier corresponding to the frequency band corresponding to the wireless communications channel, a signal to be sent to the terminal device 20, and then transmit the signal to the terminal device 20 by using an electromagnetic wave that is in wireless transmission space and that corresponds to the frequency band. Alternatively, the terminal device 20 may add, to a carrier corresponding to the frequency band corresponding to the wireless communications channel, a signal to be transmitted to the network device 10, and then transmit the signal to the network device 10 by using an electromagnetic wave that is in wireless transmission space and that corresponds to the frequency band. In this communications system, bandwidth of the wireless communications channel varies with a width of an available frequency band, and bandwidth of a signal transmitted on the wireless communications channel varies with the bandwidth of the wireless communications channel. For example, there are a plurality of communications channels of different bandwidth such as 20 megabytes (M) and 10 M in a long term evolution (long term evolution, LTE) system, and the plurality of communications channels respectively correspond to transmission signals whose bandwidth is 18 M, 7.5 M, and the like.

Before adding the signal to the carrier corresponding to the frequency band corresponding to the wireless communications channel and sending the signal to the wireless transmission space, the network device 10 or the terminal device 20 needs to perform filtering and spurious suppression on the signal, so that bandwidth of the signal matches the wireless communications channel, and an outband suppression degree of the signal meets an outband suppression degree requirement, thereby reducing interference to another transmitted signal in the wireless transmission space when the signal can be sent to the wireless transmission space. The network device or the terminal device mainly performs filtering and spurious suppression on the signal by using a filter, so that the bandwidth of the signal matches the wireless communications channel, and the outband suppression degree of the signal meets the outband suppression degree requirement.

The solutions in this application may be specifically applied to the network device or the terminal device in the communications system, and may be applied to a scenario in which the network device or the terminal device adds the signal to the carrier corresponding to the frequency band corresponding to the wireless communications channel, sends the signal to the wireless transmission space, and performs filtering and spurious suppression on the signal by using the filter. The network device is a device that communicates with the terminal device in a wireless manner. For example, the network device may be an evolved NodeB (evolved Node B, eNB) in the LTE system, or may be a next-generation NodeB (generation Node B, gNB) in a new radio (new radio, NR) system, or may be a network device in a future evolved public land mobile network (Public Land Mobile Network, PLMN). The terminal device is a device that implements functions such as Internet access and user communication based on a communication function provided by the network device. The terminal device may also be referred to as user equipment, a mobile station, a wireless communications device, a user apparatus, or the like. For example, the user equipment may be a cellular phone, a cordless phone, a handheld device with a wireless communication function, a computing device or another processing device connected to a wireless modem, a vehicle-mounted device, a wearable device, or a terminal device in the future evolved PLMN.

In this application, a boundary point of a signal to be obtained through filtering (referred to as a valid signal band below) is aligned with a side frequency point of a filter (in other words, a frequency of the boundary point is equal to a frequency of the side frequency point) through spectrum shifting, and the valid signal band is within a passband of the filter; then, a filter whose outband suppression degree meets an outband suppression degree requirement filters a signal obtained after spectrum shifting, so that a signal outside the valid signal band can be suppressed, a signal obtained after filtering is a valid signal band, and an outband suppression degree of the valid signal band meets the outband suppression degree requirement. Detailed descriptions are provided below.

Before the solutions of this application are described, some concepts involved in this application are described first.

Figure 2:
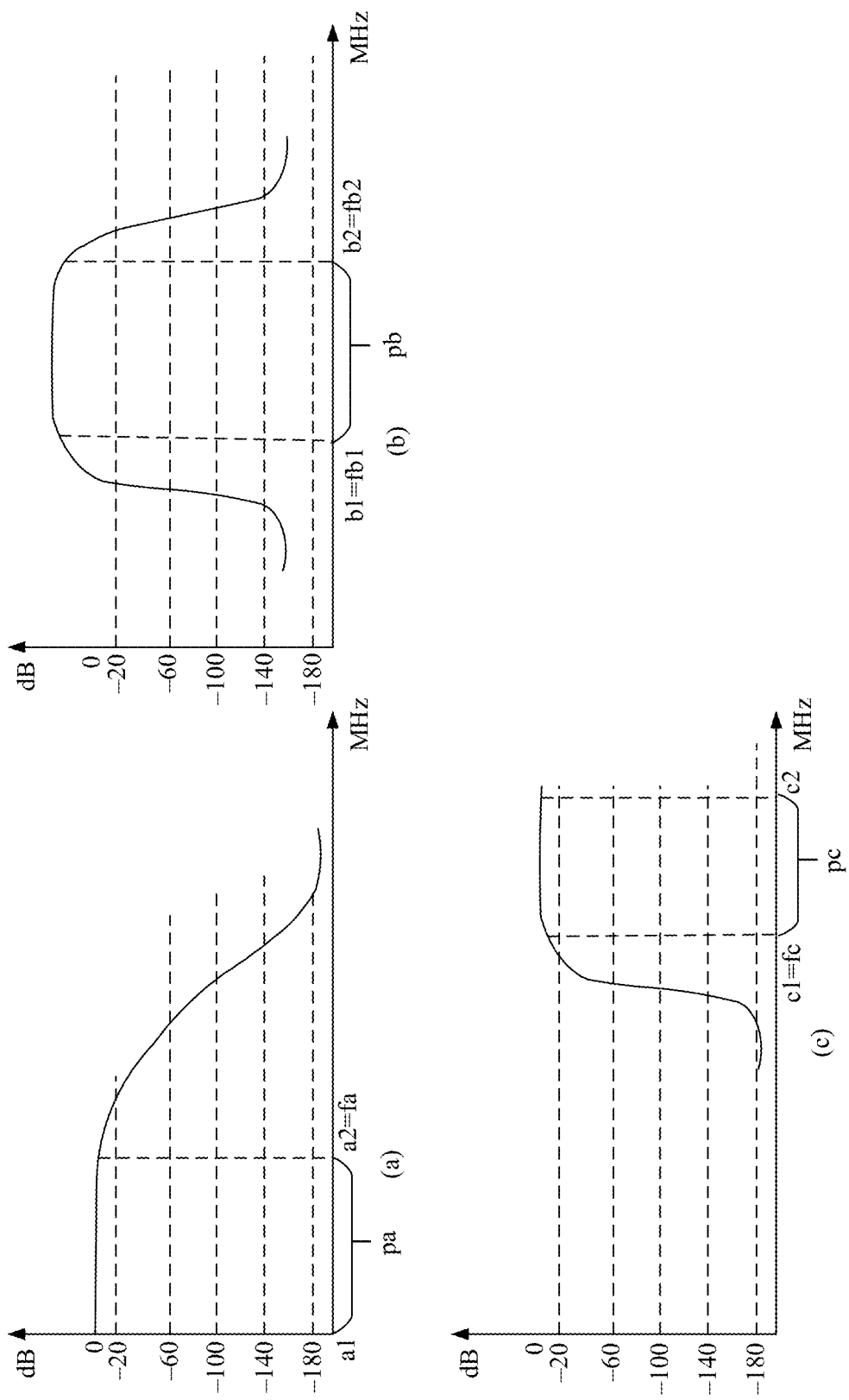
FIG. 2 is a schematic diagram of a side frequency point of a filter in a Bode plot of the filter according to an embodiment of this application.

1. A side frequency point of a filter: In this application, side frequency points of a filter include a left frequency point and a right frequency point corresponding to a passband of the filter, and may be interpreted as frequency points corresponding to a time point at which the filter causes energy of an input signal to start to attenuate substantially, to be specific, energy attenuation of an input signal within a first frequency range is relatively small, and energy attenuation of an input signal outside the first frequency range is relatively large, where the first frequency range is a frequency range between a frequency corresponding to a left side frequency point and a frequency corresponding to a right side frequency point of the filter. If the filter is a band-pass filter, a frequency of a side frequency point of the band-pass filter is equal to a cut-off frequency of the band-pass filter. If the filter is a low-pass filter, a frequency of a right side frequency point of the low-pass filter is equal to a cut-off frequency of the low-pass filter. If the filter is a high-pass filter, a frequency of a left side frequency point of the high-pass filter is equal to a cut-off frequency of the high-pass filter. A physical meaning of the cut-off frequency of the filter is a frequency of a frequency point whose insertion loss is reduced by X decibels (dB) relative to an insertion loss of a target frequency point when the insertion loss of the target frequency point at a time point at which there is no signal loss or a signal loss is relatively low is used as a reference, where a value of X may be 1, 3, 0.5, or another value. For the band-pass filter, the target frequency point is a frequency point corresponding to a center frequency. If the filter is a low-pass filter, the target frequency point is 0 hertz (Hz). For the high-pass filter, the target frequency point is a frequency point corresponding to a passband frequency at which no parasitic stopband occurs. For example, the side frequency point of the filter may be shown in a Bode plot in FIG. 2. In FIG. 2, (a), (b), and (c) are respectively a Bode plot of a low-pass filter, a Bode plot of a high-pass filter, and a Bode plot of a band-pass filter; where a1 and a2 are separately side frequency points of the low-pass filter, a frequency of the side frequency point a2 is equal to a cut-off frequency fa of the low-pass filter, and a frequency range between the side frequency point a1 and the side frequency point a2 is a passband pa of the low-pass filter; b1 and b2 are separately side frequency points of a band-pass filter, a frequency of the side frequency point b1 is equal to a cut-off frequency fb1 of the band-pass filter, a frequency of the side frequency point b2 is equal to a cut-off frequency fb2 of the band-pass filter, and a frequency range between the side frequency point b1 and the side frequency point b2 is a passband pb of the band-pass filter; and c1 and c2 are separately side frequency points of a high-pass filter, a frequency of the side frequency point c1 is equal to a cut-off frequency fc of the high-pass filter, and a frequency range between the side frequency point c1 and the side frequency point c2 is a passband pc of the high-pass filter.

2. An outband suppression degree of a filter: The outband suppression degree of the filter is an indicator of a capability of the filter to suppress a signal outside a passband of the filter. A higher outband suppression degree of the filter indicates a stronger capability of the filter to suppress the signal outside the passband of the filter, in other words, greater energy attenuation of the signal outside the passband of the filter. The outband suppression degree is measured in two manners. In one manner, an attenuation value of a specific frequency outside the passband of the filter, in other words, an attenuation value corresponding to the frequency in a Bode plot is calculated. A larger attenuation value indicates a stronger capability of the filter to suppress the signal outside the passband of the filter. The other manner is an indicator indicating a degree at which an amplitude-frequency response of the filter is close to an ideal rectangle, namely, a rectangle coefficient K. When K is closer to 1, it indicates that the filter has a stronger capability of suppressing the signal outside the passband of the filter. A larger quantity of orders of the filter indicates that a value of K is closer to 1. In this application, an outband suppression degree threshold may be an attenuation value of a specific frequency outside the passband, for example, 100 dB or 200 dB; or may be a rectangle coefficient K corresponding to the filter, for example, 0.99 or 0.98.

The technical solutions of this application are described below.

Figure 3:
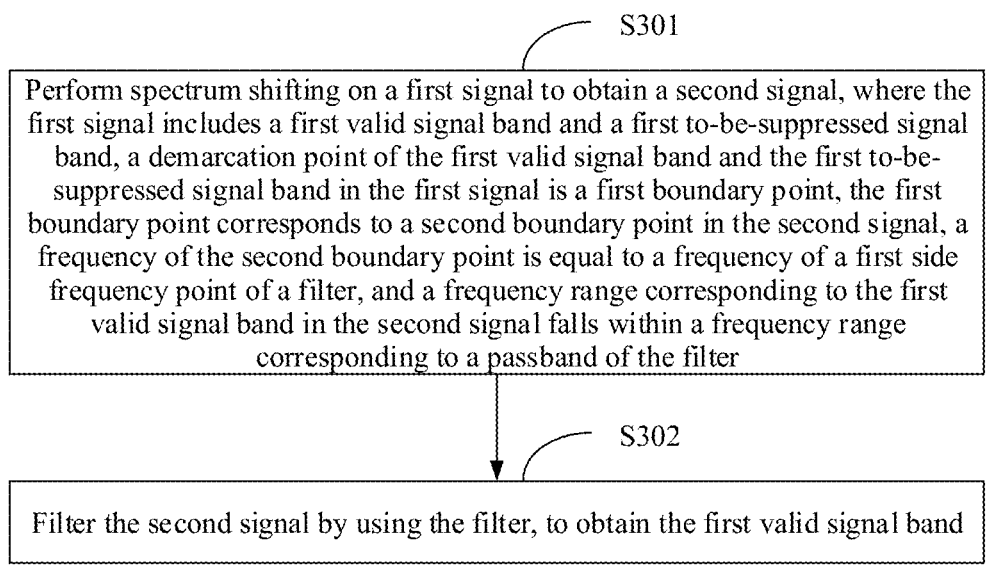
FIG. 3 is a schematic flowchart of a filtering method according to an embodiment of this application.

FIG. 3 is a schematic flowchart of a filtering method according to an embodiment of this application. The method may be implemented on the network device 10 or the terminal device 20 shown in FIG. 1. As shown in the figure, the method includes the following steps.

S301: Perform spectrum shifting on a first signal to obtain a second signal, where the first signal includes a first valid signal band and a first to-be-suppressed signal band, a demarcation point of the first valid signal band and the first to-be-suppressed signal band in the first signal is a first boundary point, the first boundary point corresponds to a second boundary point in the second signal, a frequency of the second boundary point is equal to a frequency of a first side frequency point of a filter, and a frequency range corresponding to the first valid signal band in the second signal falls within a frequency range corresponding to a passband of the filter.

Herein, the first signal is a signal that needs to be filtered, the first valid signal band is a signal that needs to be obtained by the filter through filtering, and the first to-be-suppressed signal band is a signal that needs to be suppressed by the filter through filtering. Optionally, the first signal may further include more signal bands. In this application, the signal that needs to be obtained by the filter through filtering may be referred to as a valid signal band, and a signal that does not need to be obtained by the filter through filtering or that needs to be suppressed by the filter through filtering may be referred to as a to-be-suppressed signal band.

In this embodiment of this application, the first to-be-suppressed signal band and the first valid signal band are in the following two types of location relationships in the first signal:

1. The first to-be-suppressed signal band is on a left side of the first valid signal band in the first signal. For example, a location relationship between a first to-be-suppressed signal band on a left side of a first valid signal band and the first valid signal band in a first signal s1 may be shown by U11 in FIG. 4. A first to-be-suppressed signal band B2 is on a left side of a first valid signal band B1, and a demarcation point of the first valid signal band B1 and the first to-be-suppressed signal band is p1.

2. The first to-be-suppressed signal band is on a right side of the first valid signal band in the first signal. For example, a location relationship between a first to-be-suppressed signal band on a right side of a first valid signal band and the first valid signal band in a first signal s1 may be shown by U21 in FIG. 4. A first to-be-suppressed signal band B2 is on a right side of a first valid signal band B1, and a demarcation point of the first valid signal band B1 and the first to-be-suppressed signal band is p1.

In this embodiment of this application, the performing spectrum shifting on a first signal to obtain a second signal means that overall frequency shifting is performed on a spectrum of the first signal, so that a demarcation point of the first valid signal band and the first to-be-suppressed signal band in a spectrum of the second signal obtained through overall frequency shifting is aligned with the first side frequency point of the filter, in other words, the frequency of the second boundary point is equal to the frequency of the first side frequency point.

When the first to-be-suppressed signal band is on the left side of the first valid signal band in the first signal, overall frequency shifting may be performed on the spectrum of the first signal, so that the demarcation point of the first valid signal band and the first to-be-suppressed signal band in the spectrum of the second signal obtained through overall frequency shifting is aligned with a left side frequency point of the filter, in other words, the frequency of the second boundary point is equal to a frequency of the left side frequency point of the filter. For example, a schematic diagram of the second signal obtained after shifting may be shown by U12 in FIG. 4. The first valid signal band B1 is on a right side of the first to-be-suppressed signal band B2 in the second signal s2, and the demarcation point p1 of the first valid signal band B1 and the first to-be-suppressed signal band B2 is aligned with a left side frequency point El of a filter F0.

When the first to-be-suppressed signal band is on the right side of the first valid signal band in the first signal, overall frequency shifting may be performed on the spectrum of the first signal, so that the demarcation point of the first valid signal band and the first to-be-suppressed signal band in the spectrum of the second signal obtained through overall frequency shifting is aligned with a right side frequency point of the filter, in other words, the frequency of the second boundary point is equal to a frequency of the right side frequency point of the filter. For example, a schematic diagram of the second signal obtained after shifting may be shown by U22 in FIG. 4. The first to-be-suppressed signal band B2 is on a right side of the first valid signal band B1 in the second signal s2, and the demarcation point p1 of the first valid signal band B1 and the first to-be-suppressed signal band B2 is aligned with a right side frequency point Er of a filter F0.

In specific implementation, a tenth offset and a spectrum shifting direction may be determined based on a frequency of the first boundary point and the frequency of the first side frequency point, and then, spectrum shifting is performed on the first signal in the spectrum shifting direction based on the tenth offset to obtain the second signal. The tenth offset is an absolute value of a difference between the frequency of the first side frequency point and the frequency of the first boundary point, in other words, $O10=|f1-F3|$, where $O10$ is the tenth offset, f1 is the frequency of the first boundary point, and F3 is the frequency of the first side frequency point. When the first to-be-suppressed signal band is on the right side of the first valid signal band in the first signal, the first side frequency point is the right side frequency point of the filter, F3 is equal to F2, and F2 is the frequency of the right side frequency point of the filter. When the first to-be-suppressed signal band is on the left side of the first valid signal band in the first signal, the first side frequency point is the left side frequency point of the filter, F3 is equal to F1, and F1 is the frequency of the left side frequency point of the filter. The spectrum shifting direction is a direction of the frequency of the first side frequency point relative to a second frequency in frequency domain, and the second frequency is the frequency of the first boundary point. If the frequency of the first side frequency point is on a right side of the second frequency relative to the second frequency in frequency domain, the spectrum shifting direction is rightwards, in other words, a positive frequency domain direction, and $O10=F3-f1$. If the frequency of the first side frequency point is on a left side of the second frequency relative to the second frequency in frequency domain, the spectrum shifting direction is leftwards, in other words, a negative frequency domain direction, and $O10=f1-F3$.

S302: Filter the second signal by using the filter, to obtain the first valid signal band.

Herein, the filter is a filter whose outband suppression degree meets an outband suppression degree requirement, in other words, the outband suppression degree of the filter is higher than an outband suppression degree threshold. For a definition and setting of the outband suppression degree threshold, refer to the foregoing descriptions. Details are not described herein again.

Figure 4:
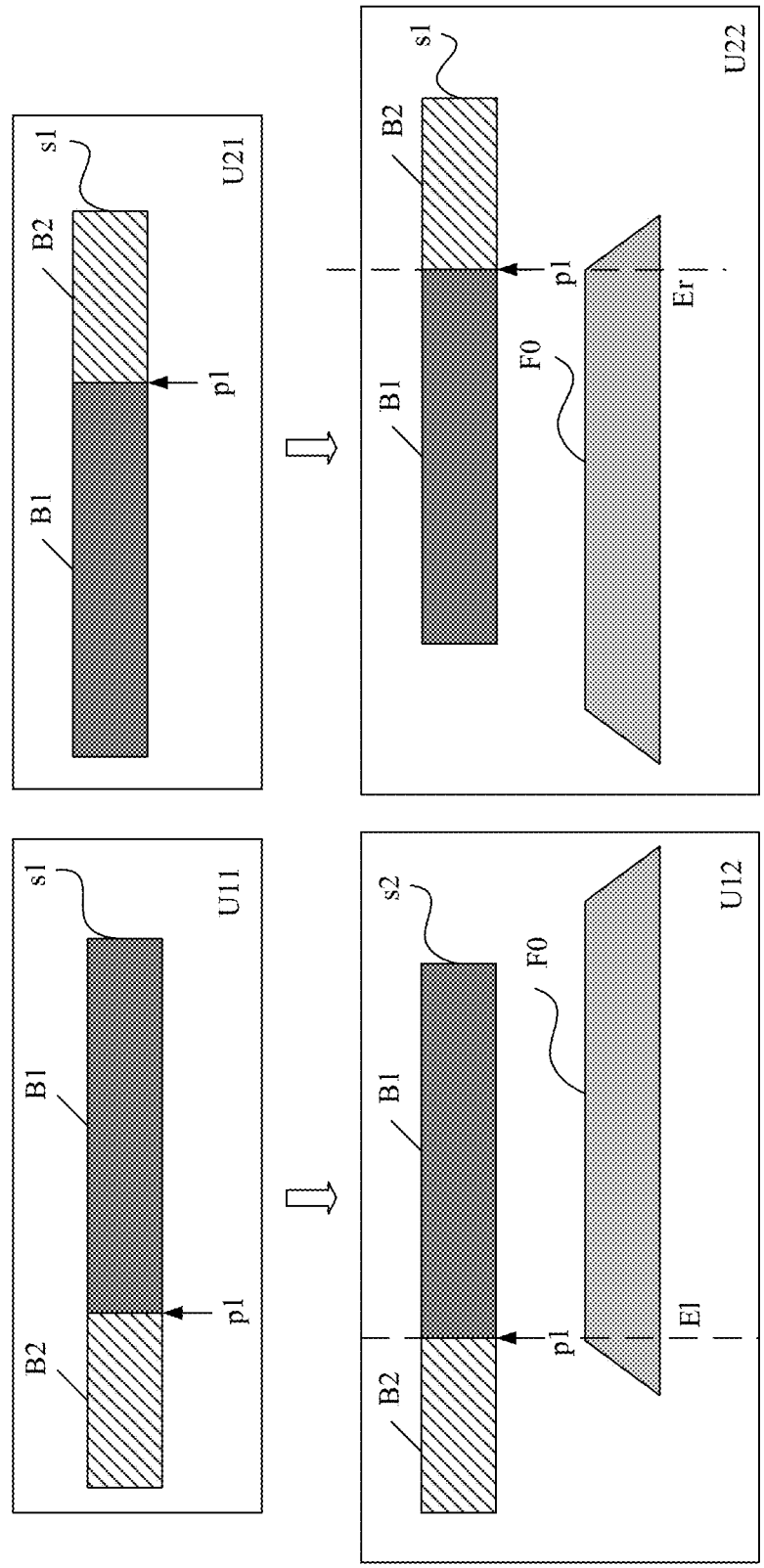
FIG. 4 is a schematic diagram of location relationships between a valid signal band and a to-be-suppressed signal band on a side of the valid signal band in signals obtained before and after spectrum shifting according to an embodiment of this application.

It may be learned with reference to FIG. 4 that, in the second signal obtained after the first signal is shifted, the demarcation point of the first valid signal band and the first to-be-suppressed signal band is aligned with the side frequency point of the filter, and the first valid signal band is within the passband of the filter. Based on a feature that the filter suppresses a signal outside the passband of the filter, when the second signal is filtered by using the filter, the first to-be-suppressed signal band can be suppressed, to obtain the first valid signal band. In other words, in this embodiment of this application, in a manner in which spectrum shifting is first performed to align a boundary of a valid signal band with the side frequency point of the filter and then the filter performs filtering, an unwanted signal can be suppressed, and any valid signal band whose bandwidth is less than or equal to passband bandwidth of the filter can be retained, so that the filter has versatility, and there is no need to design and develop a corresponding filter for a signal to be obtained through filtering.

Figure 5:
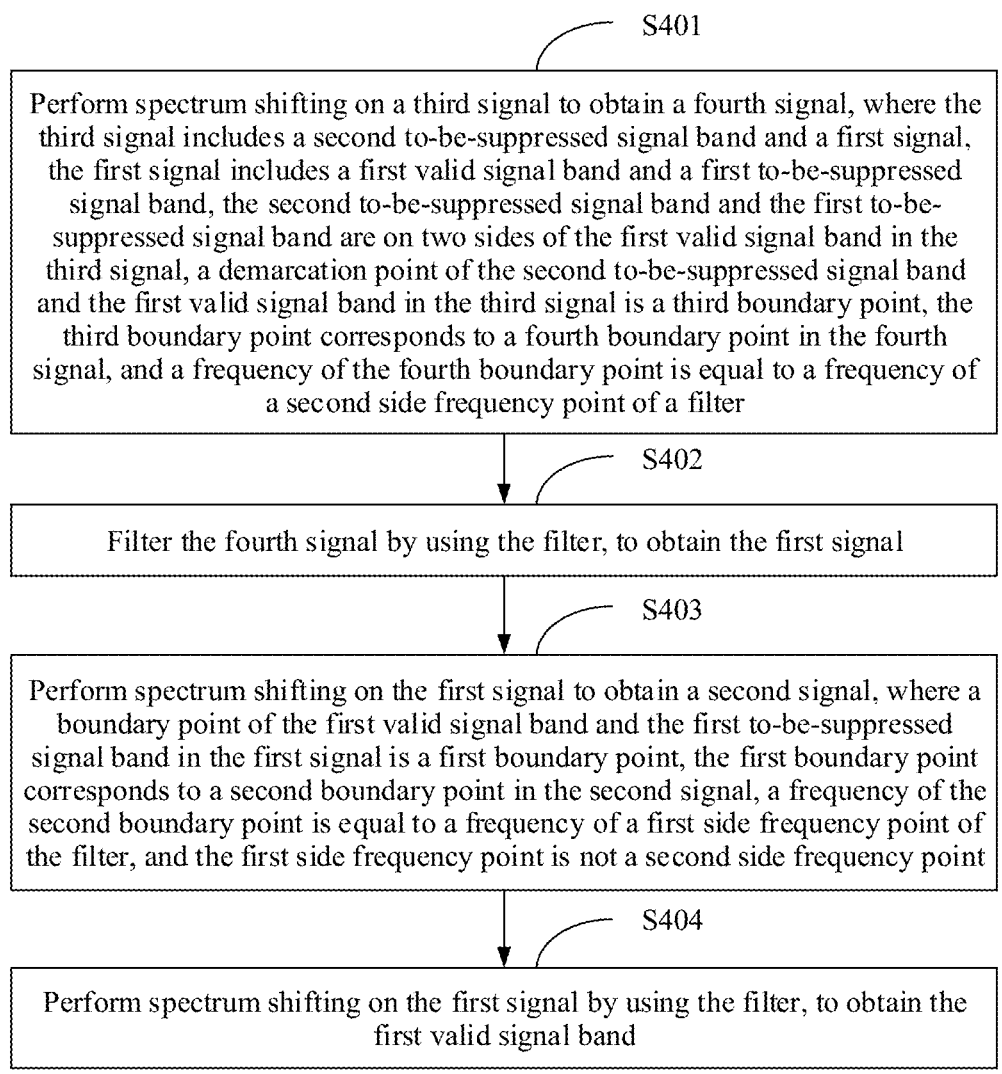
FIG. 5 is a schematic flowchart of another filtering method according to an embodiment of this application.

In some possible scenarios, a signal that needs to be filtered includes two to-be-suppressed signal bands that are separately on two sides of a valid signal band. FIG. 5 is a schematic flowchart of another filtering method according to an embodiment of this application. The method may be implemented on the network device 10 or the terminal device 20 shown in FIG. 1. As shown in the figure, the method includes the following steps.

S401: Perform spectrum shifting on a third signal to obtain a fourth signal, where the third signal includes a second to-be-suppressed signal band and a first signal, the first signal includes a first valid signal band and a first to-be-suppressed signal band, the second to-be-suppressed signal band and the first to-be-suppressed signal band are on two sides of the first valid signal band in the third signal, a demarcation point of the second to-be-suppressed signal band and the first valid signal band in the third signal is a third boundary point, the third boundary point corresponds to a fourth boundary point in the fourth signal, and a frequency of the fourth boundary point is equal to a frequency of a second side frequency point of a filter.

Herein, the third signal is a signal that needs to be filtered, the first valid signal band is a signal that needs to be obtained by the filter through filtering, and the first to-be-suppressed signal band and the second to-be-suppressed signal band each are a signal that needs to be suppressed by the filter through filtering.

In this embodiment of this application, the first valid signal band, the first to-be-suppressed signal band, and the second to-be-suppressed signal band are in the following two types of location relationships in the third signal:

1. The first to-be-suppressed signal band is on a left side of the first valid signal band in the third signal, and the second to-be-suppressed signal band is on a right side of a first valid signal band in the third signal. For example, a location relationship between a first to-be-suppressed signal band on a left side of a first valid signal band, a second to-be-suppressed signal band on a right side of the first valid signal band, and the first valid signal band in a third signal s3 may be shown by V11 in FIG. 6. A first to-be-suppressed signal band B2 is on a left side of a first valid signal band B1, a second to-be-suppressed signal band B3 is on a right side of the first valid signal band B1, a demarcation point of the first to-be-suppressed signal band B2 and the first valid signal band B1 is p1, and a demarcation point of the second to-be-suppressed signal band B3 and the first valid signal band B1 is p2.

2. The first to-be-suppressed signal band is on a right side of the first valid signal band in the third signal, and the second to-be-suppressed signal band is on a left side of the first valid signal in the third signal. For example, a location relationship between a first to-be-suppressed signal band on a right side of a first valid signal band, a second to-be-suppressed signal band on a left side of the first valid signal band, and the first valid signal band in a third signal s3 may be shown by V21 in FIG. 6. A first to-be-suppressed signal band B2 is on a right side of a first valid signal band B1, a second to-be-suppressed signal band B3 is on a left side of the first valid signal band B1, a demarcation point of the first to-be-suppressed signal band B2 and the first valid signal band B1 is p1, and a demarcation point of the second to-be-suppressed signal band B3 and the first valid signal band B1 is p2.

In this embodiment of this application, the performing spectrum shifting on a third signal to obtain a fourth signal means that overall frequency shifting is performed on a spectrum of the third signal, so that a demarcation point of the second to-be-suppressed signal band and the first valid signal band in a spectrum of the fourth signal obtained through overall frequency shifting is aligned with the second side frequency point of the filter, in other words, the frequency of the fourth boundary point is equal to the frequency of the second side frequency point.

When the second to-be-suppressed signal band is on the right side of the first valid signal band in the third signal, overall frequency shifting may be performed on the spectrum of the third signal, so that the demarcation point of the second to-be-suppressed signal band and the first valid signal band in the spectrum of the fourth signal obtained through overall frequency shifting is aligned with a right side frequency point of the filter, in other words, the frequency of the fourth boundary point is equal to a frequency of the right side frequency point of the filter. For example, a schematic diagram of the fourth signal obtained after shifting may be shown by U12 in FIG. 6. The second to-be-suppressed signal band B3 is on a right side of the first valid signal band B1 in the fourth signal s4, and the demarcation point p2 of the second to-be-suppressed signal band B3 and the first valid signal band B1 is aligned with a right side frequency point Er of a filter F0.

When the second to-be-suppressed signal band is on the left side of the first valid signal band in the third signal, overall frequency shifting may be performed on the spectrum of the third signal, so that the demarcation point of the second to-be-suppressed signal band and the first valid signal band in the spectrum of the fourth signal obtained through overall frequency shifting is aligned with a left side frequency point of the filter, in other words, the frequency of the fourth boundary point is equal to a frequency of the left side frequency point of the filter. For example, a schematic diagram of the fourth signal obtained after shifting may be shown by V22 in FIG. 6. The demarcation point p2 of the second to-be-suppressed signal band B3 and the first valid signal band B1 in the fourth signal s4 is aligned with a left side frequency point El of the filter.

In specific implementation, a thirteenth offset and a spectrum shifting direction may be determined based on a frequency of the third boundary point and the frequency of the second side frequency point, and then, spectrum shifting is performed on the third signal in the spectrum shifting direction based on the thirteenth offset to obtain the fourth signal. The thirteenth offset is an absolute value of a difference between the frequency of the second side frequency point and the frequency of the third boundary point, in other words, $O13=|f2-F4|$, where $O13$ is the thirteenth offset, $f2$ is the frequency of the third boundary point, and $F4$ is the frequency of the second side frequency point. When the second to-be-suppressed signal band is on the right side of the first valid signal band in the third signal, the second side frequency point is the right side frequency point of the filter, $F4$ is equal to $F2$, and $F2$ is a frequency of the right side frequency point of the filter. When the second to-be-suppressed signal band is on the left side of the first valid signal band in the third signal, the second side frequency point is the left side frequency point of the filter, $F4$ is equal to $F1$, and $F1$ is a frequency of the left side frequency point of the filter. The spectrum shifting direction is a direction of the frequency of the second side frequency point relative to a second frequency in frequency domain, and the second frequency is the frequency of the third boundary point. If the frequency of the second side frequency point is on a right side of the second frequency relative to the second frequency in frequency domain, the spectrum shifting direction is rightwards, in other words, a positive frequency domain direction, and $O13=F4-f2$. If the frequency of the second side frequency point is on a left side of the second frequency relative to the second frequency in frequency domain, the spectrum shifting direction is leftwards, in other words, a negative frequency domain direction, and $O13=f2-F4$.

S402: Filter the fourth signal by using the filter, to obtain the first signal.

Figure 6:
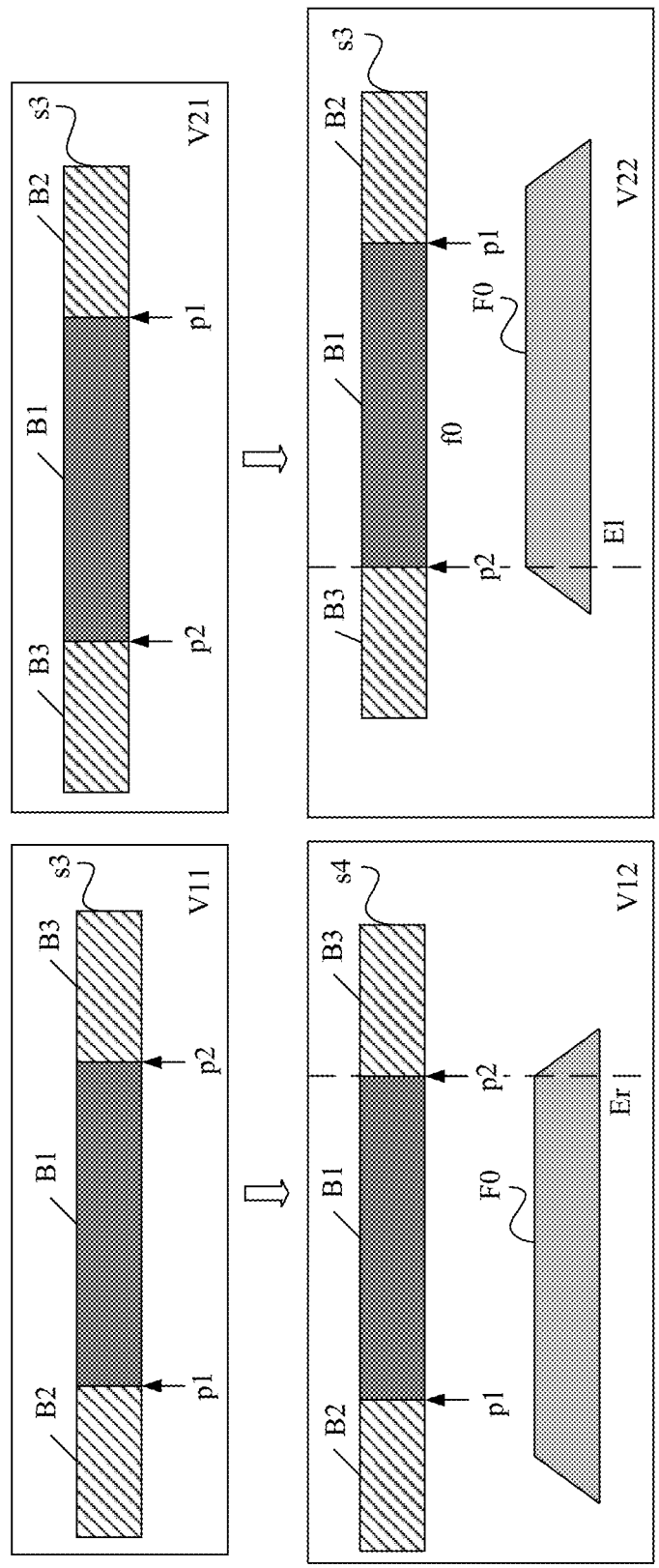
FIG. 6 is a schematic diagram of location relationships between a valid signal band and to-be-suppressed signal bands on two sides of the valid signal band in signals obtained before and after spectrum shifting according to an embodiment of this application.

Herein, it may be learned with reference to FIG. 6 that, in the fourth signal obtained after the third signal is shifted, the demarcation point of the second to-be-suppressed signal band and the first valid signal band is aligned with the second side frequency point of the filter, and the first valid signal band is within a passband of the filter. Based on a feature that the filter suppresses a signal outside the passband of the filter, when the second signal is filtered by using the filter, the first to-be-suppressed signal band can be suppressed, to obtain the first signal.

S403: Perform spectrum shifting on the first signal to obtain a second signal, where a boundary point of the first valid signal band and the first to-be-suppressed signal band in the first signal is a first boundary point, the first boundary point corresponds to a second boundary point in the second signal, a frequency of the second boundary point is equal to a frequency of a first side frequency point of the filter, and the first side frequency point is not the second side frequency point.

Herein, for a specific implementation of step S403, refer to the descriptions of step S301 and the schematic diagram shown in FIG. 4. Details are not described herein again. If the second side frequency point is the left side frequency point, the first side frequency point is the right side frequency point. If the second side frequency point is the right side frequency point, the first side frequency point is the left side frequency point.

S404: Perform spectrum shifting on the first signal by using the filter, to obtain the first valid signal band.

It may be learned with reference to FIG. 6 and FIG. 4 that, for the third signal that includes two to-be-suppressed signal bands that are separately on two sides of a valid signal band, spectrum shifting is performed first, so that a demarcation point of the valid signal band of the third signal and a to-be-suppressed signal band on one side of the valid signal band is aligned with one side frequency point of the filter, and the valid signal band is within the passband of the filter; a signal obtained after shifting is filtered by using the filter, so that the to-be-suppressed signal band on one side of the valid signal band can be suppressed, thereby obtaining a first signal that includes only a to-be-suppressed signal band on the other side of the valid signal band; then, spectrum shifting is performed, so that a demarcation point of the valid signal band of the first signal and the to-be-suppressed signal band on the other side of the valid signal band is aligned with another side frequency point of the filter, and the valid signal band is within the passband of the filter; and then, a signal obtained through shifting is filtered by using the filter, so that the to-be-suppressed signal band on the other side of the valid signal band can be suppressed, to obtain the valid signal band. In other words, in this embodiment of this application, in a manner of performing a combination of spectrum shifting and filtering twice, invalid signals on two sides of any valid signal band whose bandwidth is less than or equal to passband bandwidth of the filter can be suppressed, to obtain the valid signal band through filtering, and there is no need to design and develop a corresponding filter for a signal to be obtained through filtering.

Figure 7A:
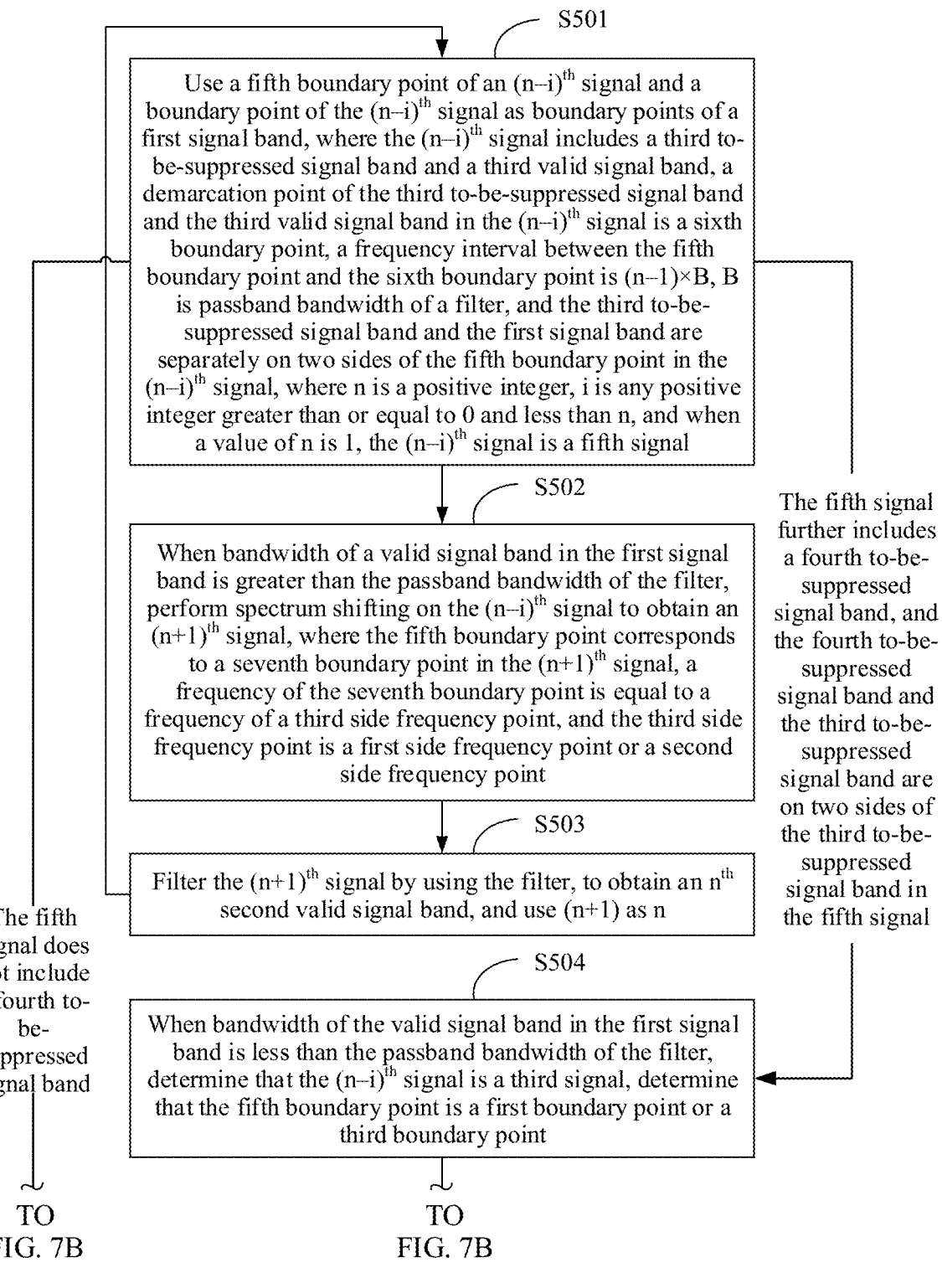
FIG. 7A and FIG. 7B are a schematic flowchart of still another filtering method according to an embodiment of this application.
Figure 7B:
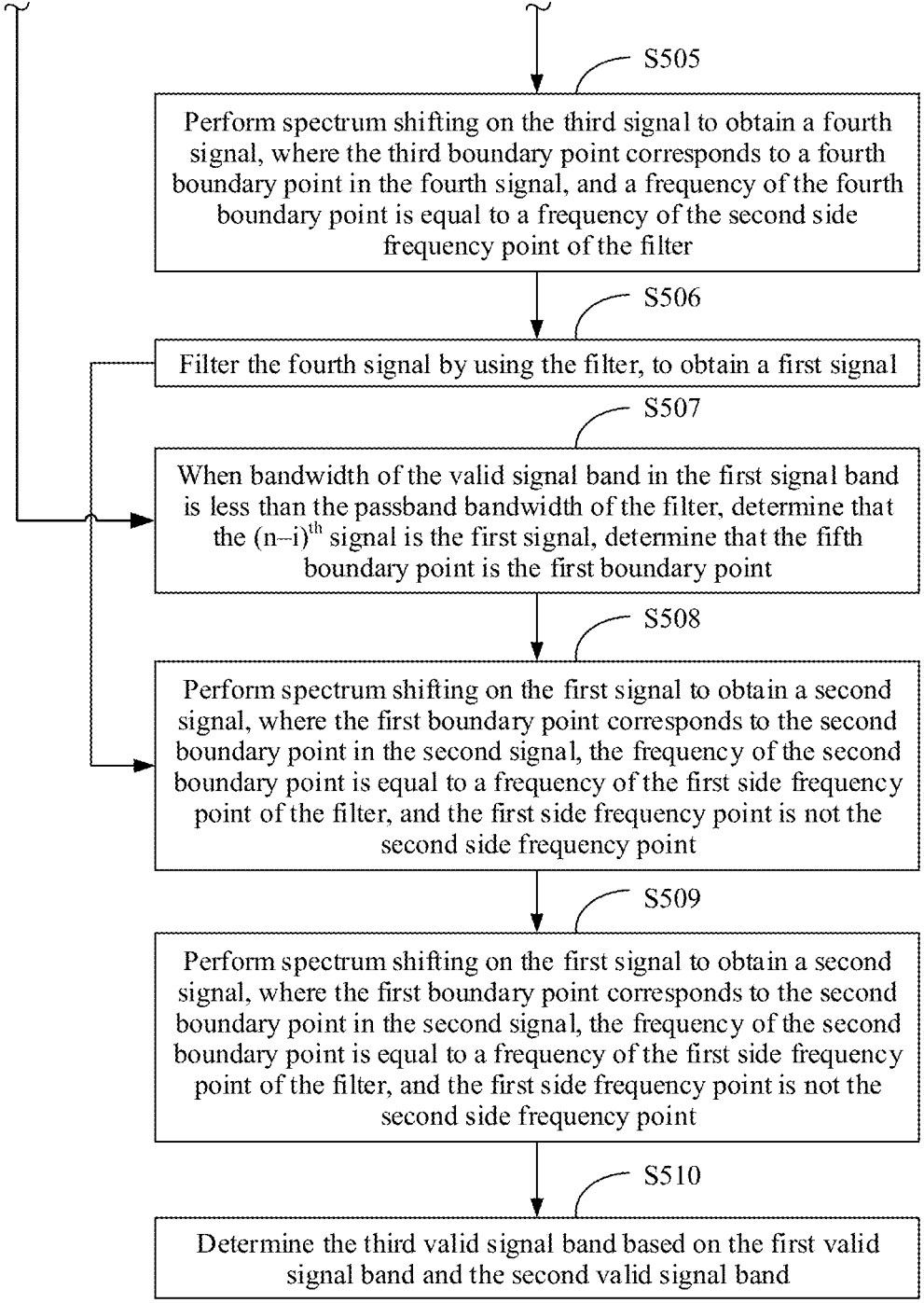

In some possible scenarios, bandwidth of a valid signal band in the signal that needs to be filtered is greater than the passband bandwidth of the filter. FIG. 7A and FIG. 7B are a schematic flowchart of still another filtering method according to an embodiment of this application. The method may be implemented on the network device 10 or the terminal device 20 shown in FIG. 1. As shown in the figure, the method includes the following steps.

S501: Use a fifth boundary point of an $(n-i)^{th}$ signal and a boundary point of the $(n-i)^{th}$ signal as boundary points of a first signal band, where the $(n-i)^{th}$ signal includes a third to-be-suppressed signal band and a third valid signal band, a demarcation point of the third to-be-suppressed signal band and the third valid signal band in the $(n-i)^{th}$ signal is a sixth boundary point, a frequency interval between the fifth boundary point and the sixth boundary point is $(n-1) \times B$, B is passband bandwidth of a filter, and the third to-be-suppressed signal band and the first signal band are separately on two sides of the fifth boundary point in the $(n-1)^{th}$ signal, where n is a positive integer, i is any positive integer greater than or equal to 0 and less than n, and when a value of n is 1, the $(n-i)^{th}$ signal is a fifth signal.

Herein, the fifth signal is a signal that needs to be filtered, the third valid signal band is a signal that needs to be obtained by the filter through filtering, and the third to-be-suppressed signal band is a signal that needs to be suppressed by the filter through filtering.

Figure 8A:
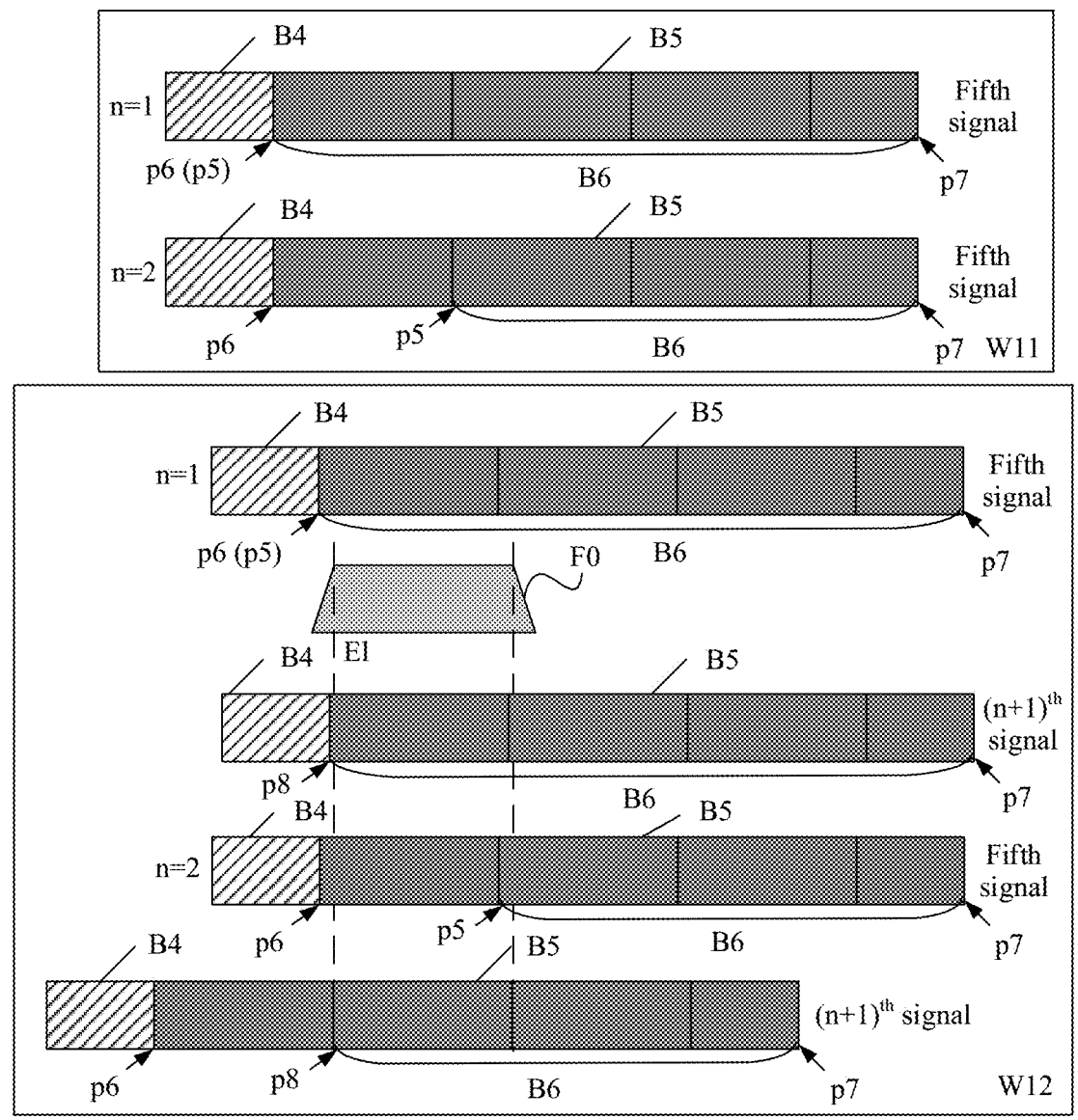
FIG. 8A and FIG. 8B are a schematic diagram of location relationships between a valid signal band and to-be-suppressed signal bands on two sides of the valid signal band in signals obtained before and after spectrum shifting according to an embodiment of this application.
Figure 8B:
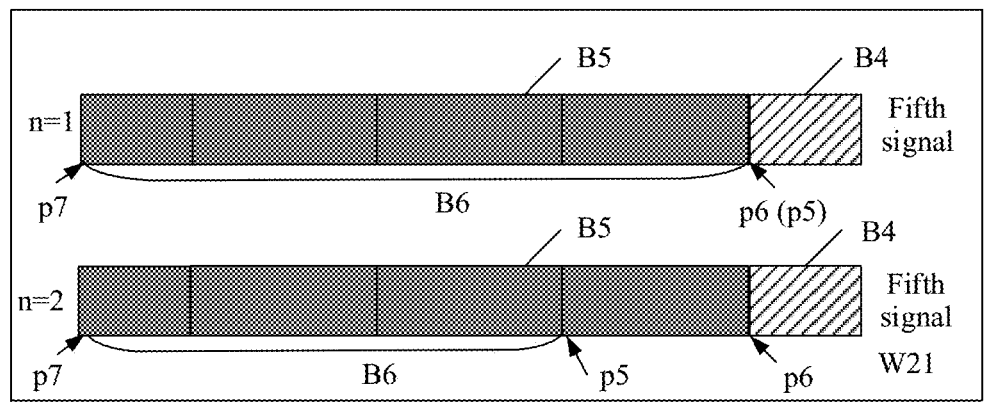
Figure 8B:
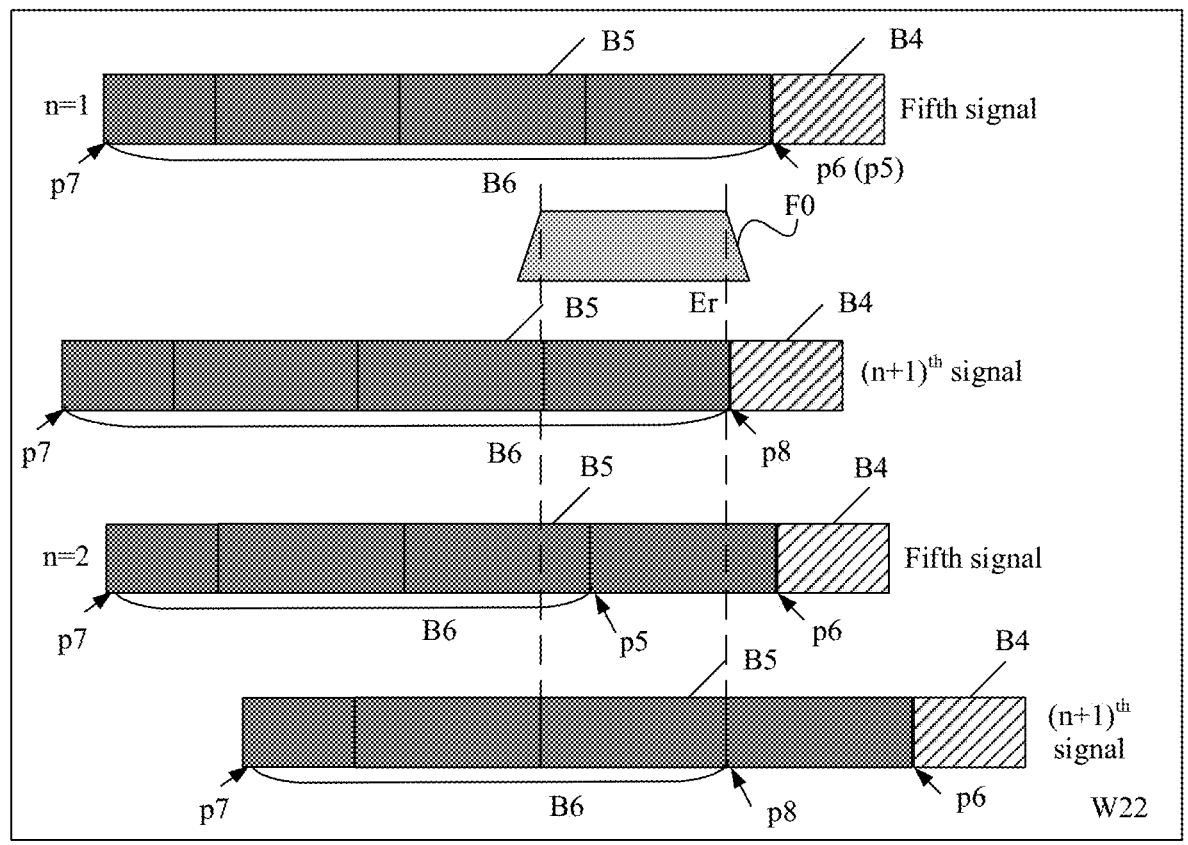

In this embodiment of this application, the third to-be-suppressed signal band and the first signal band are in the following two types of location relationships in the $(n-i)^{th}$ signal:

1. The third to-be-suppressed signal band is on a left side of the fifth boundary point in the $(n-i)^{th}$ signal, and the first signal band is on a right side of the fifth boundary point in the $(n-i)^{th}$ signal. For example, a location relationship between the third to-be-suppressed signal band on the left side of the fifth boundary point, the first signal band on the right side of the fifth boundary point, and the fifth boundary point in the $(n-i)^{th}$ signal Sn-i may be shown by W11 in FIG. 8A and FIG. 8B. When the value of n is 1, the signal Sn-i is the fifth signal, the frequency interval between the fifth boundary point p5 and the sixth boundary point p6 is 0, in other words, the fifth boundary point p5 is the sixth boundary point p6, the sixth boundary point p6 is a demarcation point of the third to-be-suppressed signal band B4 and the third valid signal band B5, the third to-be-suppressed signal band B4 is on a left side of the sixth boundary point p6, the first signal band B6 is on a right side of the sixth boundary point p6, and boundary points of the first signal band B6 are the sixth boundary point p6 and a boundary point p7 of the fifth signal. When the value of n is 2, the signal Sn-i is the fifth signal or a signal S2. FIG. 8A and FIG. 8B show a case in which the signal Sn-i is the fifth signal. The frequency interval between the fifth boundary point p5 and the sixth boundary point p6 is B, the third to-be-suppressed signal band B4 is on a left side of the fifth boundary point p5, the first signal band B6 is on a right side of the fifth boundary point p5, and boundary points of the first signal band B6 are the fifth boundary point p5 and a boundary point p7 of the fifth signal. The descriptions herein are not limited. When n has a larger value, the location relationship between the third to-be-suppressed signal band, the first valid signal band, and the fifth boundary point in the signal Sn-i may be determined by analogy.

2. The third to-be-suppressed signal band is on a right side of the fifth boundary point in the $(n-i)^{th}$ signal, and the first signal band is on a left side of the fifth boundary point in the $(n-i)^{th}$ signal. For example, a location relationship between the third to-be-suppressed signal band on the right side of the fifth boundary point, the first signal band on the left side of the fifth boundary point, and the fifth boundary point in the $(n-i)^{th}$ signal Sn-i may be shown by W21 in FIG. 8A and FIG. 8B. When the value of n is 1, the signal Sn-i is the fifth signal, the frequency interval between the fifth boundary point p5 and the sixth boundary point p6 is 0, in other words, the fifth boundary point p5 is the sixth boundary point p6, the sixth boundary point p6 is a demarcation point of the third to-be-suppressed signal band B4 and the third valid signal band B5, the third to-be-suppressed signal band B4 is on a right side of the sixth boundary point p6, the first signal band B6 is on a left side of the sixth boundary point p6, and boundary points of the first signal band B6 are the sixth boundary point p6 and a boundary point p7 of the fifth signal. When the value of n is 2, the signal Sn-i is the fifth signal or a signal S1. FIG. 8A and FIG. 8B show a case in which the signal Sn-i is the fifth signal. The frequency interval between the fifth boundary point p5 and the sixth boundary point p6 is B, the third to-be-suppressed signal band B4 is on a right side of the fifth boundary point p5, the first signal band B6 is on a left side of the fifth boundary point p5, and boundary points of the first signal band B6 are the fifth boundary point p5 and a boundary point p7 of the fifth signal. The descriptions herein are not limited. When n has a larger value, the location relationship between the third to-be-suppressed signal band, the first valid signal band, and the fifth boundary point in the signal Sn-i may be determined by analogy.

S502: When bandwidth of a valid signal band in the first signal band is greater than the passband bandwidth of the filter, perform spectrum shifting on the $(n-i)^{th}$ signal to obtain an $(n+1)^{th}$ signal, where the fifth boundary point corresponds to a seventh boundary point in the $(n+1)^{th}$ signal, a frequency of the seventh boundary point is equal to a frequency of a third side frequency point, and the third side frequency point is a first side frequency point or a second side frequency point.

Herein, when the fifth signal further includes a fourth to-be-suppressed signal band, and the fourth to-be-suppressed signal band and the third to-be-suppressed signal band are on two sides of the third to-be-suppressed signal band in the fifth signal, the third side frequency point is the first side frequency point or the second side frequency point. When the fifth signal does not include the fourth to-be-suppressed signal band, the third side frequency point is the first side frequency point.

In this embodiment of this application, the performing spectrum shifting on the $(n-i)^{th}$ signal to obtain an $(n+1)^{th}$ signal means that overall frequency shifting is performed on a spectrum of the $(n-i)^{th}$ signal, so that in a spectrum of the $(n+1)^{th}$ signal obtained through overall frequency shifting, a boundary point whose frequency interval from the sixth boundary point is $(n-1) \times B$ is aligned with the third side frequency point, and the sixth boundary point is a demarcation point of the third to-be-suppressed signal band and the third valid signal band, in other words, the frequency of the seventh boundary point is equal to the frequency of the third side frequency point.

When the third to-be-suppressed signal band is on the left side of the fifth boundary point in the $(n-i)^{th}$ signal, overall frequency shifting may be performed on the spectrum of the $(n-i)^{th}$ signal, so that in the spectrum of the $(n+1)^{th}$ signal obtained through overall frequency shifting, a boundary point whose frequency interval from the sixth boundary point is $(n-1) \times B$ is aligned with a left side frequency point of the filter, in other words, the frequency of the seventh boundary point is equal to a frequency of the left side frequency point of the filter. For example, a schematic diagram of the $(n+1)^{th}$ signal obtained after shifting may be shown by W12 in FIG. 8A and FIG. 8B. When the value of n is 1, a seventh boundary point p8 is a demarcation point of the third to-be-suppressed signal band B4 and the third valid signal band B5, the third to-be-suppressed signal band B4 is on a left side of the seventh boundary point p8 in the $(n+1)^{th}$ signal, the first signal band B6 is on a right side of the seventh boundary point p8 in the $(n+1)^{th}$ signal, and the seventh boundary point p8 is aligned with a left side frequency point El of a filter F0. When the value of n is 2, an interval between a seventh boundary point p8 and a demarcation point of the third to-be-suppressed signal band B4 and the third valid signal band B5 is B, the third to-be-suppressed signal band B4 is on a left side of the seventh boundary point p8 in the $(n+1)^{th}$ signal, the first signal band B6 is on a right side of the seventh boundary point p8 in the $(n+1)^{th}$ signal, and the seventh boundary point p8 is aligned with a left side frequency point El of a filter F0. The descriptions herein are not limited. When n has a larger value, the location relationship between the third to-be-suppressed signal band, the first signal band, and the seventh boundary point in the $(n+1)^{th}$ signal may be determined by analogy.

When the third to-be-suppressed signal band is on the right side of the fifth boundary point in the $(n-i)^{th}$ signal, overall frequency shifting may be performed on the spectrum of the $(n-i)^{th}$ signal, so that in the spectrum of the $(n+1)^{th}$ signal obtained through overall frequency shifting, a boundary point whose frequency interval from the sixth boundary point is $(n-1) \times B$ is aligned with a right side frequency point of the filter, in other words, the frequency of the seventh boundary point is equal to a frequency of the right side frequency point of the filter. For example, a schematic diagram of the $(n+1)^{th}$ signal obtained after shifting may be shown by W22 in FIG. 8A and FIG. 8B. When the value of n is 1, a seventh boundary point p8 is a demarcation point of the third to-be-suppressed signal band B4 and the third valid signal band B5, the third to-be-suppressed signal band B4 is on a right side of the seventh boundary point p8 in the $(n+1)^{th}$ signal, the first signal band B6 is on a left side of the seventh boundary point p8 in the $(n+1)^{th}$ signal, and the seventh boundary point p8 is aligned with a right side frequency point Er of a filter F0. When the value of n is 2, an interval between a seventh boundary point p8 and a demarcation point of the third to-be-suppressed signal band B4 and the third valid signal band B5 is B, the third to-be-suppressed signal band B4 is on a right side of the seventh boundary point p8 in the $(n+1)^{th}$ signal, the first signal band B6 is on a left side of the seventh boundary point p8 in the $(n+1)^{th}$ signal, and the seventh boundary point p8 is aligned with a right side frequency point Er of a filter F0. The descriptions herein are not limited. When n has a larger value, the location relationship between the third to-be-suppressed signal band, the first signal band, and the seventh boundary point in the $(n+1)^{th}$ signal may be determined by analogy.

In specific implementation, an offset may be determined based on a frequency of the sixth boundary point in the fifth signal and a frequency of the first side frequency point, and a spectrum shifting direction may be determined based on a value relationship between a frequency of the fifth boundary point in the $(n-i)^{th}$ signal and the frequency of the third side frequency point. Then, spectrum shifting is performed on the $(n-i)^{th}$ signal in the spectrum shifting direction based on the offset to obtain the $(n+1)^{th}$ signal. When the third to-be-suppressed signal band is on the left side of the fifth boundary point in the $(n-i)^{th}$ signal, the third side frequency point is the left side frequency point of the filter, the offset is calculated based on a fourteenth formula, and the fourteenth formula is:

$$O14 = \begin{cases} |f3 + (n-1) \times B - F1|, (n-i) = 1 \\ (i+1) \times B, (n-i) > 1 \end{cases},$$

where O14 is the offset, f3 is the frequency of the sixth boundary point in the fifth signal, and F1 is the frequency of the left side frequency point of the filter. When the third to-be-suppressed signal band is on the right side of the fifth boundary point in the $(n-i)^{th}$ signal, the third side frequency point is the right side frequency point of the filter, the offset is calculated based on a fifteenth formula, and the fifteenth formula is:

$$O15 = \begin{cases} |F2 - f3 + (n-1) \times B|, (n-i) = 1 \\ (i+1) \times B, (n-i) > 1 \end{cases},$$

where O15 is the offset, f3 is the frequency of the sixth boundary point in the fifth signal, and F2 is the frequency of the right side frequency point of the filter. If the frequency of the fifth boundary point in the $(n-i)^{th}$ signal is greater than the frequency of the third side frequency point, the spectrum shifting direction is leftwards, in other words, a negative frequency domain direction. If the frequency of the fifth boundary point in the $(n-i)^{th}$ signal is less than the frequency of the third side frequency point, the spectrum shifting direction is rightwards, in other words, a positive frequency domain direction.

S503: Filter the $(n+1)^{th}$ signal by using the filter, to obtain an $n^{th}$ second valid signal band, and perform step S501 by using (n+1) as n.

Herein, it may be learned with reference to FIG. 8A and FIG. 8B that, in the $(n+1)^{th}$ signal, the boundary point whose frequency interval from the sixth boundary point is (n−1)×B is aligned with the first side frequency point of the filter. The $(n+1)^{th}$ signal may be filtered by using the filter, to obtain a second valid signal band whose frequency interval from the sixth boundary point in the fifth signal is (n−1)×B and whose bandwidth is equal to the passband bandwidth of the filter.

S504: When bandwidth of the valid signal band in the first signal band is less than the passband bandwidth of the filter, determine that the $(n-i)^{th}$ signal is a third signal, determine that the fifth boundary point is a first boundary point or a third boundary point, and perform step S505.

Specifically, when the fifth signal further includes the fourth to-be-suppressed signal band, and the fourth to-be-suppressed signal band and the third to-be-suppressed signal band are on two sides of the third valid signal band in the fifth signal, it is determined that the $(n-i)^{th}$ signal is a second signal. Optionally, when the third side frequency point is the first side frequency point, it is determined that the fifth boundary point is the first boundary point, and it is determined that an eighth boundary point is the third boundary point, and the eighth boundary point is a demarcation point of the fourth to-be-suppressed signal band and the third valid signal band in the $(n-i)^{th}$ signal. When the third side frequency point is the second side frequency point, it is determined that the fifth boundary point is the third boundary point, and it is determined that an eighth boundary point is the first boundary point.

S505: Perform spectrum shifting on the third signal to obtain a fourth signal, where the third boundary point corresponds to a fourth boundary point in the fourth signal, and a frequency of the fourth boundary point is equal to a frequency of the second side frequency point of the filter.

S506: Filter the fourth signal by using the filter, to obtain a first signal.

Herein, for a specific implementation of steps S505 and S506, refer to the descriptions of steps S401 and S402 and the schematic diagram shown in FIG. 6. Details are not described herein again. If the first side frequency point is the left side frequency point, the second side frequency point is the right side frequency point. If the first side frequency point is the right side frequency point, the second side frequency point is the left side frequency point.

S507: When bandwidth of the valid signal band in the first signal band is less than the passband bandwidth of the filter, determine that the $(n-i)^{th}$ signal is the first signal, determine that the fifth boundary point is the first boundary point, and perform step S508.

Specifically, when the fifth signal includes only the third to-be-suppressed signal band and does not include the fourth to-be-suppressed signal band, it is determined that the $(n-i)^{th}$ signal is the first signal.

S508: Perform spectrum shifting on the first signal to obtain the second signal, where the first boundary point corresponds to the second boundary point in the second signal, the frequency of the second boundary point is equal to a frequency of the first side frequency point of the filter, and the first side frequency point is not the second side frequency point.

S509: Filter the second signal by using the filter, to obtain the first valid signal band.

Herein, for a specific implementation of steps S507 and S508, refer to the descriptions of steps S301 and S302 and the schematic diagram shown in FIG. 4. Details are not described herein again.

S510: Determine the third valid signal band based on the first valid signal band and the second valid signal band.

Specifically, when the second valid signal band is not obtained, the first valid signal band is determined as the third valid signal band, and when the second valid signal band is obtained, signal splicing is performed on the first valid signal band and the second valid signal band to obtain the third valid signal band.

The foregoing embodiment corresponding to FIG. 7A and FIG. 7B is described below by using an example. Refer to FIG. 9A-1, FIG. 9A-2, and FIG. 9B.

Figures 1, 9A:
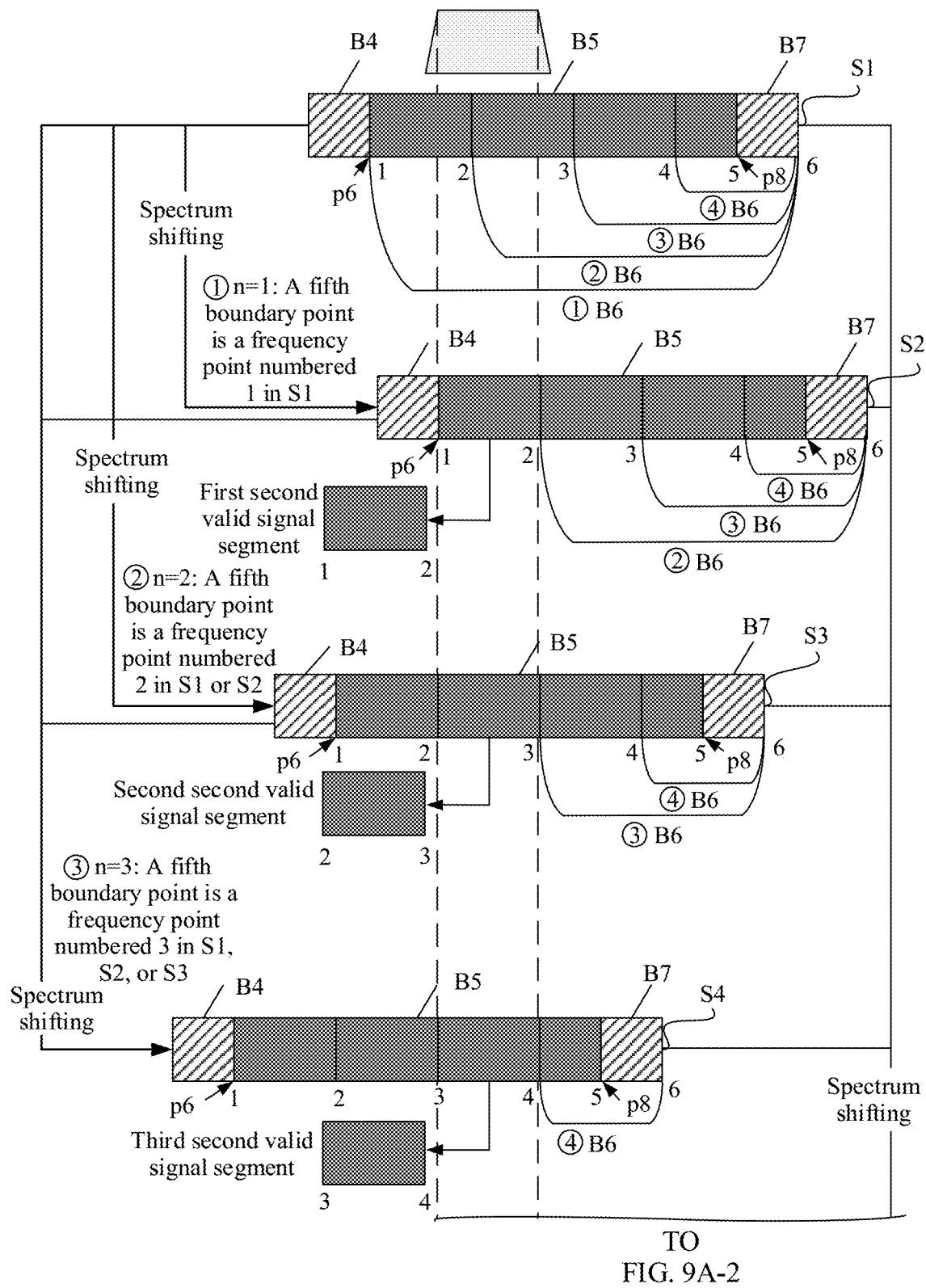
Figures 2, 9A:
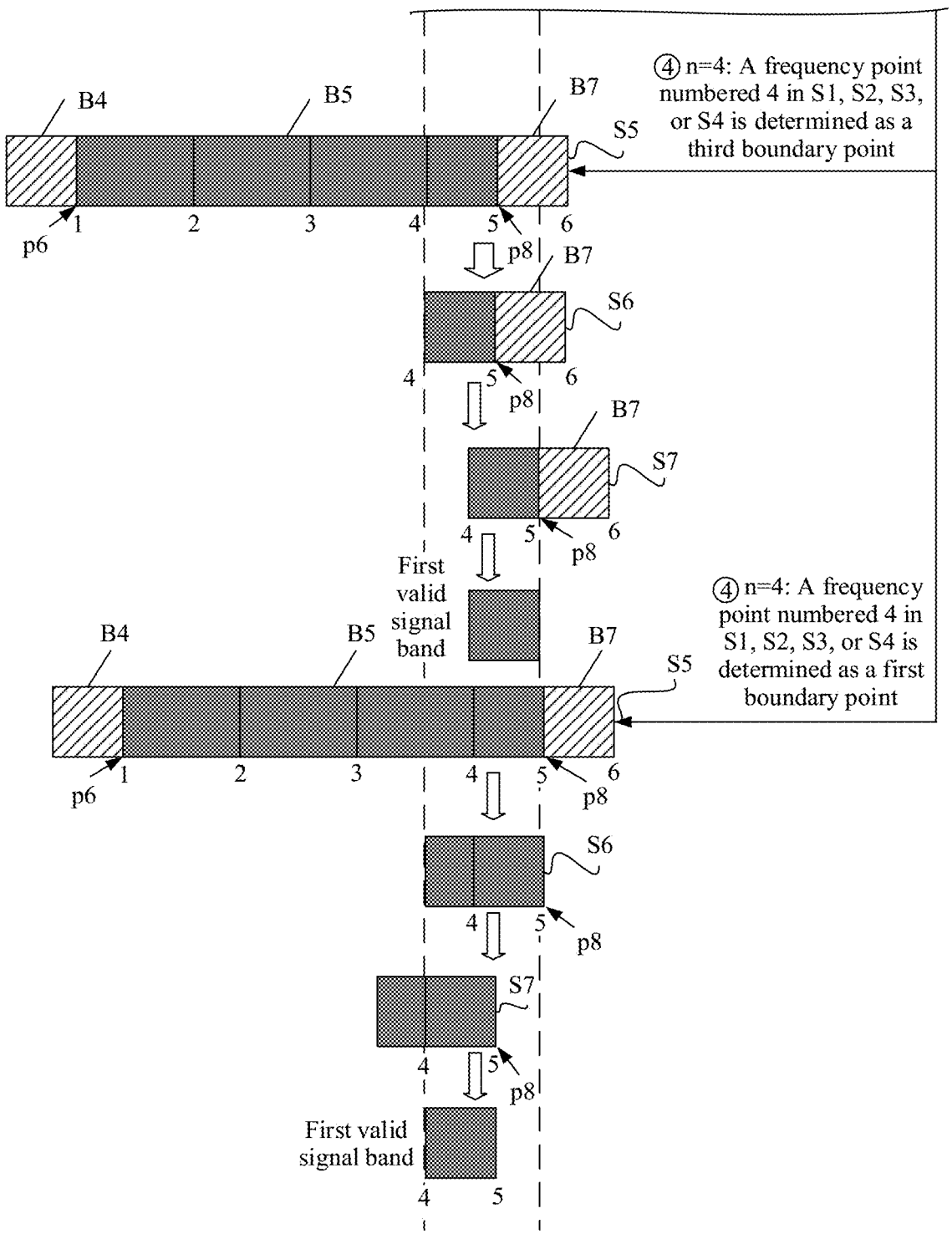

A fifth signal in FIG. 9A-1 and FIG. 9A-2 includes a third to-be-suppressed signal band B4, a third valid signal band B5, and a fourth to-be-suppressed signal band B7. The third to-be-suppressed signal band B4 is on a left side of the third valid signal band B5, a demarcation point of the third to-be-suppressed signal band B4 and the third valid signal band B5 is a sixth boundary point p6, the fourth to-be-suppressed signal band B7 is on a right side of the third valid signal band B5, and a demarcation point of the fourth to-be-suppressed signal band B4 and the third valid signal band B5 is an eighth boundary point p8, where bandwidth of the third valid signal band B5 is 3.5 times of passband bandwidth of a filter. A process of obtaining the third valid signal band is as follows.

①A value of n is 1.

The $(n-i)^{th}$ signal is a fifth signal S1, a fifth boundary point of the $(n-i)^{th}$ signal is a frequency point whose frequency interval from a sixth boundary point p6 is 0, in other words, the fifth boundary point is a frequency point numbered 1 in the fifth signal S1. The fifth boundary point of the fifth signal and a boundary point of the fifth signal are used as boundary points of a first signal band, the third to-be-suppressed signal band and the first signal band are on two sides of the fifth boundary point, and the first signal band B6 is a signal band between the frequency point numbered 1 and a frequency point numbered 6 in the fifth signal S1. Bandwidth of a valid signal band between the frequency point numbered 1 and the frequency point numbered 6 in the fifth signal S1 is 3.5B, and is greater than the passband bandwidth of the filter. In this case, spectrum shifting is performed on the fifth signal S1 to obtain a second signal S2. The fifth boundary point of the fifth signal S1 corresponds to a seventh boundary point in the second signal S2, and the seventh boundary point is equal to a frequency of a left side frequency point of the filter. The fifth boundary point is the frequency point numbered 1 in the fifth signal, and the seventh boundary point is a frequency point numbered 1 in the second signal, in other words, the frequency point numbered 1 in the second signal is equal to the frequency of the left side frequency point of the filter.

The second signal S2 is filtered by using the filter, to obtain a first second valid signal band, where the first second valid signal band corresponds to a signal segment between the frequency point numbered 1 and a frequency point numbered 2 in the fifth signal. If (n+1) is used as n, the value of n is 2.

②A value of n is 2.

The $(n-i)^{th}$ signal may be a fifth signal S1 (i=1), or the $(n-i)^{th}$ signal may be a second signal S2 (i=0), a fifth boundary point of the $(n-i)^{th}$ signal is a frequency point whose frequency interval from the sixth boundary point p6 is B, in other words, the fifth boundary point is a frequency point numbered 2 in the fifth signal S1 or the second signal S2. The fifth boundary point of the $(n-i)^{th}$ signal and a boundary point of the $(n-i)^{th}$ signal are used as boundary points of a first signal band B6, the third to-be-suppressed signal band and the first signal band are on two sides of the fifth boundary point, and the first signal band B6 is a signal band between the frequency point numbered 2 and a frequency point numbered 6 in the fifth signal S1 or the second signal S2. Bandwidth of a valid signal band between the frequency point numbered 2 and the frequency point numbered 6 in the fifth signal S1 or the second signal S2 is 2.5B, and is greater than the passband bandwidth of the filter. In this case, spectrum shifting is performed on the fifth signal S1 or the second signal S2 to obtain a third signal S3. The fifth boundary point of the fifth signal S1 or the second signal S2 corresponds to a seventh boundary point in the third signal S3, and the seventh boundary point is equal to a frequency of a left side frequency point of the filter. The fifth boundary point is a frequency point numbered 2 in the fifth signal S1 or the second signal S2, and the seventh boundary point is a frequency point numbered 2 in the third signal, in other words, the frequency point numbered 2 in the third signal is equal to the frequency of the left side frequency point of the filter.

The third signal S3 is filtered by using the filter, to obtain a second second valid signal band, where the second second valid signal band corresponds to a signal segment between the frequency point numbered 2 and a frequency point numbered 3 in the fifth signal. If (n+1) is used as n, the value of n is 3.

③ A value of n is 3.

The $(n-i)^{th}$ signal may be a fifth signal S1 (i=2), or the $(n-i)^{th}$ signal may be a second signal S2 (i=1), or the $(n-i)^{th}$ signal may be a third signal S3 (i=0), a fifth boundary point of the $(n-i)^{th}$ signal is a frequency point whose frequency interval from a sixth boundary point p6 is 2B, in other words, the fifth boundary point is a frequency point numbered 3 in the fifth signal S1, the second signal S2, or the third signal S3. The fifth boundary point of the $(n-i)^{th}$ signal and a boundary point of the $(n-i)^{th}$ signal are used as boundary points of a first signal band B6, the third to-be-suppressed signal band and the first signal band are on two sides of the fifth boundary point, and the first signal band B6 is a signal band between the frequency point numbered 3 and a frequency point numbered 6 in the fifth signal S1, the second signal S2, or the third signal S3.

Bandwidth of a valid signal band between the frequency point numbered 3 and the frequency point numbered 6 in the fifth signal S1, the second signal S2, or the third signal S3 is 1.5B, and is greater than the passband bandwidth of the filter. In this case, spectrum shifting is performed on the fifth signal S1, the second signal S2, or the third signal S3 to obtain a fourth signal S4. The fifth boundary point of the fifth signal S1, the second signal S2, or the third signal S3 corresponds to a seventh boundary point in the fourth signal S4, and the seventh boundary point is equal to a frequency of a left side frequency point of the filter. The fifth boundary point is the frequency point numbered 3 in the fifth signal S1, the second signal S2, or the third signal S3, and the seventh boundary point is a frequency point numbered 3 in the fourth signal S4, in other words, the frequency point numbered 4 in the fourth signal is equal to the frequency of the left side frequency point of the filter.

The fourth signal S4 is filtered by using the filter, to obtain a third second valid signal band, where the third second valid signal band corresponds to a signal segment between the frequency point numbered 3 and a frequency point numbered 4 in the fifth signal. If (n+1) is used as n, the value of n is 4.

④ A value of n is 4.

The $(n-i)^{th}$ signal may be a fifth signal S1 (i=3), or the $(n-i)^{th}$ signal may be a second signal S2 (i=2), or the $(n-i)^{th}$ signal may be a third signal S3 (i=1), or the $(n-i)^{th}$ signal may be a fourth signal S4 (i=0), a fifth boundary point of the $(n-i)^{th}$ signal is a frequency point whose frequency interval from a sixth boundary point p6 is 3B, in other words, the fifth boundary point is a frequency point numbered 4 in the fifth signal S1, the second signal S2, the third signal S3, or the fourth signal S4. The fifth boundary point of the $(n-i)^{th}$ signal and a boundary point of the $(n-i)^{th}$ signal are used as boundary points of a first signal band B6, the third to-be-suppressed signal band and the first signal band are on two sides of the fifth boundary point, and the first signal band B6 is a signal band between the frequency point numbered 4 and a frequency point numbered 5 in the fifth signal S1, the second signal S2, the third signal S3, or the fourth signal S4.

Bandwidth of a valid signal band between the frequency point numbered 4 and the frequency point numbered 5 in the fifth signal S1, the second signal S2, the third signal S3, or the fourth signal S4 is 0.5B, and is less than the passband bandwidth of the filter. If the $(n-i)^{th}$ signal further includes a fourth to-be-suppressed signal band B7, the fifth signal S1, the second signal S2, the third signal S3, or the fourth signal S4 is determined as a third signal, and the fifth boundary point is determined as a third boundary point or a first boundary point, and the fifth boundary point is the frequency point numbered 4 in the fifth signal S1, the second signal S2, the third signal S3, or the fourth signal S4, in other words, the frequency point numbered 4 in the fifth signal S1, the second signal S2, the third signal S3, or the fourth signal S4 is determined as the third boundary point or the first boundary point.

(1) When the frequency point numbered 4 in the fifth signal S1, the second signal S2, the third signal S3, or the fourth signal S4 is determined as the third boundary point, spectrum shifting is performed on the fifth signal S1, the second signal S2, the third signal S3, or the fourth signal S4 to obtain a fourth signal S5. The third boundary point of the third signal corresponds to a fourth boundary point in the fourth signal, and the fourth boundary point is equal to the frequency of the left side frequency point of the filter. The third boundary point is the frequency point numbered 4 in the fifth signal S1, the second signal S2, the third signal S3, or the fourth signal S4, and the fourth boundary point is a frequency point numbered 4 in the fourth signal S5, in other words, the frequency point numbered 4 in the fourth signal S5 is equal to the frequency of the left side frequency point of the filter. The fourth signal S5 is filtered by using the filter, to obtain a first signal S6, and a first boundary point of the first signal is an eighth boundary point p6, in other words, a frequency point numbered 6. Spectrum shifting is performed on the first signal to obtain a second signal S7, where the first boundary point of the first signal corresponds to a second boundary point in the second signal, and the second boundary point is equal to the frequency of the right side frequency point of the filter, in other words, a frequency point numbered 6 in the second signal is equal to the frequency of the right side frequency point of the filter. The second signal is filtered by using the filter, to obtain a first valid signal band, where the first valid signal band corresponds to a signal segment between the frequency point numbered 4 and the frequency point numbered 5 in the fifth signal.

(2) When the frequency point numbered 4 in the fifth signal S1, the second signal S2, the third signal S3, or the fourth signal S4 is determined as the first boundary point, an eighth boundary point in the fifth signal S1, the second signal S2, the third signal S3, or the fourth signal S4 is determined as a third boundary point, in other words, the frequency point numbered 5 in the fifth signal S1, the second signal S2, the third signal S3, or the fourth signal S4. Spectrum shifting is performed on the fifth signal S1, the third signal S3, or the fourth signal S4, to obtain a fourth signal S5. The third boundary point of the third signal corresponds to a fourth boundary point in the fourth signal, and the fourth boundary point is equal to the frequency of the right side frequency point of the filter. The third boundary point is the frequency point numbered 5 in the fifth signal S1, the second signal S2, the third signal S3, or the fourth signal S4, the fourth boundary point is a frequency point numbered 5 in the fourth signal S5, in other words, the frequency point numbered 5 in the fourth signal S5 is equal to the frequency of the right side frequency point of the filter. The fourth signal S5 is filtered by using the filter, to obtain a first signal S6, and a first boundary point of the first signal is a fifth boundary point, in other words, a frequency point numbered 5. Spectrum shifting is performed on the first signal S6 to obtain a second signal S7, where the first boundary point of the first signal corresponds to a second boundary point in the second signal, and the second boundary point is equal to the frequency of the left side frequency point of the filter, in other words, a frequency point numbered 5 in the second signal is equal to the frequency of the right side frequency point of the filter. The second signal is filtered by using the filter, to obtain a first valid signal band, where the first valid signal band corresponds to a signal segment between the frequency point numbered 4 and the frequency point numbered 5 in the fifth signal.

⑤ Signal splicing is performed on the first second valid signal band, the second second valid signal band, the third second valid signal band, and the first valid signal band to obtain the third valid signal band.

Figure 9B:
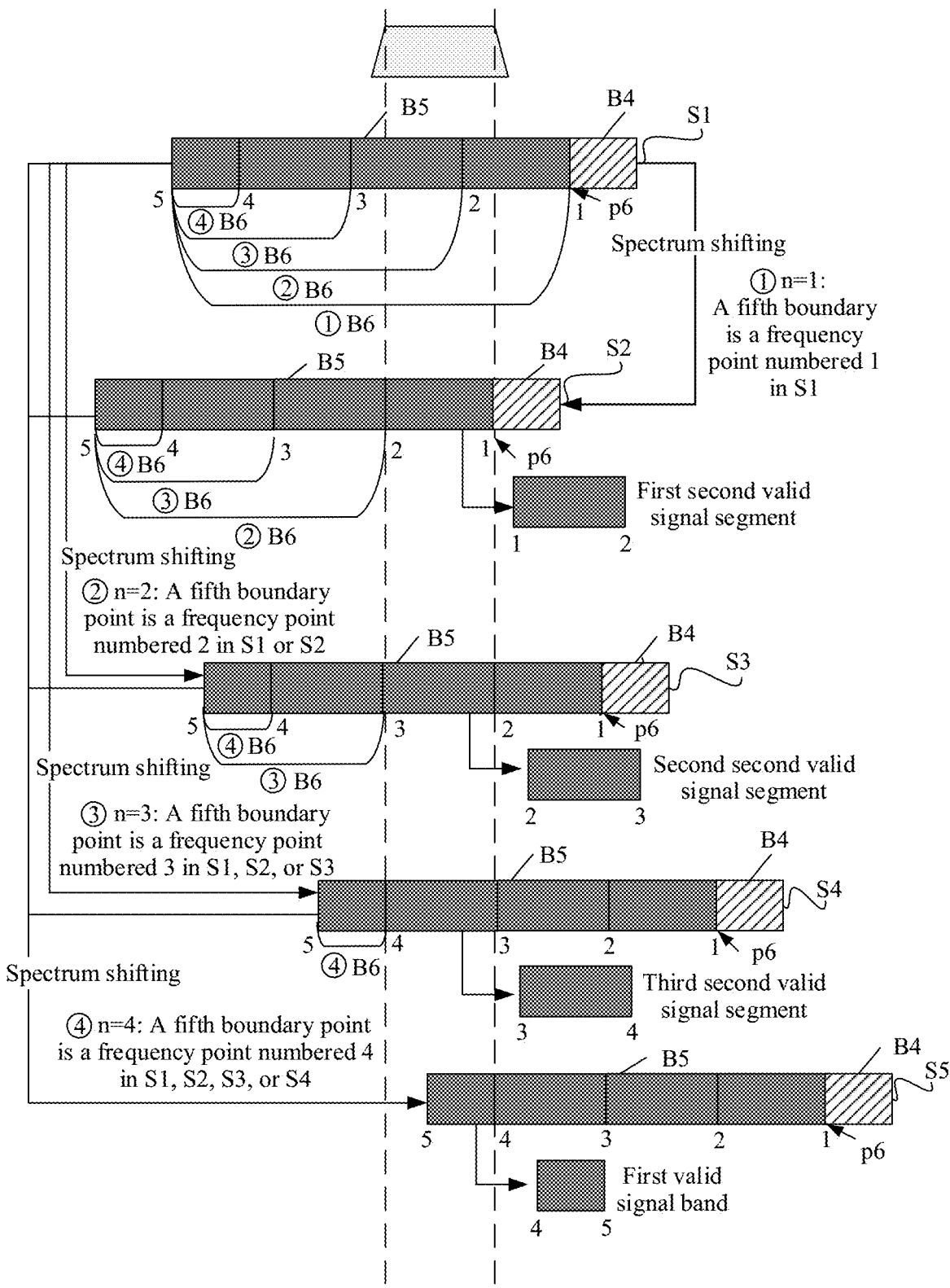

A fifth signal in FIG. 9B includes a third to-be-suppressed signal band B4 and a third valid signal band B5. The third to-be-suppressed signal band B4 is on a right side of the third valid signal band B5, a demarcation point of the third to-be-suppressed signal band B4 and the third valid signal band B5 is a sixth boundary point p6, and bandwidth of the third valid signal band B5 is 3.5 times of passband bandwidth of a filter. A process of obtaining the third valid signal band is as follows.

① A value of n is 1.

The $(n-i)^{th}$ signal is a fifth signal S1, a fifth boundary point of the $(n-i)^{th}$ signal is a frequency point whose frequency interval from the sixth boundary point p6 is 0, in other words, the fifth boundary point is a frequency point numbered 1 in the fifth signal S1. The fifth boundary point of the fifth signal and a boundary point of the fifth signal are used as boundary points of a first signal band B6, the third to-be-suppressed signal band and the first signal band are on two sides of the fifth boundary point, and the first signal band B6 is a signal band between the frequency point numbered 1 and a frequency point numbered 5 in the fifth signal S1. Bandwidth of a valid signal band between the frequency point numbered 1 and the frequency point numbered 5 in the fifth signal S1 is 3.5B, and is greater than the passband bandwidth of the filter. In this case, spectrum shifting is performed on the fifth signal S1 to obtain a second signal S2. The fifth boundary point of the fifth signal S1 corresponds to a seventh boundary point in the second signal S2, and the seventh boundary point is equal to a frequency of a right side frequency point of the filter. The fifth boundary point is the frequency point numbered 1 in the fifth signal, and the seventh boundary point is a frequency point numbered 1 in the second signal S2, in other words, the frequency point numbered 1 in the second signal S2 is equal to the frequency of the right side frequency point of the filter.

The second signal S2 is filtered by using the filter, to obtain a first second valid signal band, where the first second valid signal band corresponds to a signal segment between the frequency point numbered 1 and a frequency point numbered 2 in the fifth signal. If (n+1) is used as n, the value of n is 2.

② A value of n is 2.

The $(n-i)^{th}$ signal may be a fifth signal S1 (i=1), or the $(n-i)^{th}$ signal may be a second signal S2 (i=0), a fifth boundary point of the $(n-i)^{th}$ signal is a frequency point whose frequency interval from the sixth boundary point p6 is B, in other words, the fifth boundary point is a frequency point numbered 2 in the fifth signal S1 or the second signal S2. The fifth boundary point of the $(n-i)^{th}$ signal and a boundary point of the $(n-i)^{th}$ signal are used as boundary points of a first signal band B6, the third to-be-suppressed signal band and the first signal band are on two sides of the fifth boundary point, and the first signal band B6 is a signal band between the frequency point numbered 2 and a frequency point numbered 5 in the fifth signal S1 or the second signal S2. Bandwidth of a valid signal band between the frequency point numbered 2 and the frequency point numbered 5 in the fifth signal S1 or the second signal S2 is 2.5B, and is greater than the passband bandwidth of the filter. In this case, spectrum shifting is performed on the fifth signal S1 or the second signal S2 to obtain a third signal S3. The fifth boundary point of the fifth signal S1 or the second signal S2 corresponds to a seventh boundary point in the third signal S3, and the seventh boundary point is equal to a frequency of a right side frequency point of the filter. The fifth boundary point is the frequency point numbered 2 in the fifth signal S1 or the second signal S2, and the seventh boundary point is a frequency point numbered 2 in the third signal S3, in other words, a frequency point numbered 2 in the third signal is equal to the frequency of the right side frequency point of the filter.

The third signal S3 is filtered by using the filter, to obtain a second second valid signal band, where the second second valid signal band corresponds to a signal segment between the frequency point numbered 2 and a frequency point numbered 3 in the fifth signal. If (n+1) is used as n, the value of n is 3.

③ A value of n is 3.

The $(n-i)^{th}$ signal may be a fifth signal S1 (i=2), or the $(n-i)^{th}$ signal may be a second signal S2 (i=1), or the $(n-i)^{th}$ signal may be a third signal S3 (i=0), a fifth boundary point of the $(n-i)^{th}$ signal is a frequency point whose frequency interval from the sixth boundary point p6 is 2B, in other words, the fifth boundary point is a frequency point numbered 3 in the fifth signal S1, the second signal S2, or the third signal S3. The fifth boundary point of the $(n-i)^{th}$ signal and a boundary point of the $(n-i)^{th}$ signal are used as boundary points of a first signal band B6, the third to-be-suppressed signal band and the first signal band are on two sides of the fifth boundary point, and the first signal band B6 is a signal band between the frequency point numbered 3 and a frequency point numbered 5 in the fifth signal S1, the second signal S2, or the third signal S3. Bandwidth of a valid signal band between the frequency point numbered 3 and the frequency point numbered 5 in the fifth signal S1, the second signal S2, or the third signal S3 is 1.5B, and is greater than the passband bandwidth of the filter. In this case, spectrum shifting is performed on the fifth signal S1, the second signal S2, or the third signal S3 to obtain a fourth signal S4. The fifth boundary point of the fifth signal S1, the second signal S2, or the third signal S3 corresponds to a seventh boundary point in the fourth signal S4, and the seventh boundary point is equal to a frequency of a right side frequency point of the filter. The fifth boundary point is the frequency point numbered 3 in the fifth signal S1, the second signal S2, or the third signal S3, and the seventh boundary point is a frequency point numbered 3 in the fourth signal S4, in other words, a frequency point numbered 3 in the fourth signal S4 is equal to the frequency of the right side frequency point of the filter.

The fourth signal S4 is filtered by using the filter, to obtain a third second valid signal band, where the third second valid signal band corresponds to a signal segment between the frequency point numbered 3 and a frequency point numbered 4 in the fifth signal. If (n+1) is used as n, the value of n is 4.

④ A value of n is 4.

The $(n-i)^{th}$ signal may be a fifth signal S1 (i=3), or the $(n-i)^{th}$ signal may be a second signal S2 (i=2), or the $(n-i)^{th}$ signal may be a third signal S3 (i=1), or the $(n-i)^{th}$ signal may be a fourth signal S4 (i=0), a fifth boundary point of the $(n-i)^{th}$ signal is a frequency point whose frequency interval from the sixth boundary point p6 is 3B, in other words, the fifth boundary point is a frequency point numbered 4 in the fifth signal S1, the second signal S2, the third signal S3, or the fourth signal S4. The fifth boundary point of the $(n-i)^{th}$ signal and a boundary point of the $(n-i)^{th}$ signal are used as boundary points of a first signal band B6, the third to-be-suppressed signal band and the first signal band are on two sides of the fifth boundary point, and the first signal band B6 is a signal band between the frequency point numbered 4 and a frequency point numbered 5 in the fifth signal S1, the second signal S2, the third signal S3, or the fourth signal S4. Bandwidth of a valid signal band between the frequency point numbered 4 and the frequency point numbered 5 in the fifth signal S1, the second signal S2, the third signal S3, or the fourth signal S4 is 0.5B, and is less than the passband bandwidth of the filter. The fifth signal S1, the second signal S2, the third signal S3, or the fourth signal S4 is determined as a first signal, the fifth boundary point is determined as a first boundary point, and the fifth boundary point is the frequency point numbered 4 in the fifth signal S1, the second signal S2, the third signal S3, or the fourth signal S4, in other words, the frequency point numbered 4 in the fifth signal S1, the second signal S2, the third signal S3, or the fourth signal S4 is determined as the first boundary point.

When the frequency point numbered 4 in the fifth signal S1, the second signal S2, the third signal S3, or the fourth signal S4 is determined as the first boundary point, spectrum shifting is performed on the fifth signal S1, the second signal S2, the third signal S3, or the fourth signal S4 to obtain a second signal S5. The first boundary point of the first signal corresponds to a second boundary point in the second signal, and a frequency of the second boundary point is equal to a frequency of a left side frequency point of the filter. The first boundary point is the frequency point numbered 4 in the fifth signal S1, the second signal S2, the third signal S3, or the fourth signal S4, and the second boundary point is a frequency point numbered 4 in the second signal S5, in other words, the frequency point numbered 4 in the second signal S5 is equal to the frequency of the left side frequency point of the filter. The second signal S5 is filtered by using the filter, to obtain a first valid signal band, where the first valid signal band corresponds to a signal segment between the frequency point numbered 4 and a frequency point numbered 5 in the fifth signal.

⑤ Signal splicing is performed on the first second valid signal band, the second second valid signal band, the third second valid signal band, and the first valid signal band to obtain the third valid signal band.

It may be learned from with reference to FIG. 9A-1, FIG. 9A-2, and FIG. 9B that, for a valid signal band whose bandwidth is greater than the passband bandwidth of the filter, a plurality of second valid signal bands whose spectra do not overlap each other and whose bandwidth is equal to the passband bandwidth of the filter are first obtained through filtering in a manner of performing shifting and filtering for a plurality of times; then, spectrum shifting and filtering are performed on signals obtained in first several times of spectrum shifting, to obtain a first valid signal band whose spectrum does not overlap that of the second valid signal band and whose bandwidth is less than or equal to the passband bandwidth of the filter; and finally, signal splicing may be performed on the first valid signal band and the second valid signal band to obtain a valid signal band whose bandwidth is greater than that of the filter, and there is no need to design and develop a corresponding filter for a signal to be obtained through filtering, thereby saving manpower and material resources.

When the solution in this application is applied to a scenario in which the network device or the terminal device adds a signal to a carrier corresponding to a frequency band corresponding to a wireless communications channel and sends the signal for wireless transmission, and performs filtering and spurious suppression on the signal by using the filter, a signal that needs to be filtered is a baseband signal, a signal to be obtained through filtering is a passband signal, and the passband signal may also be referred to as a valid signal. A different value relationship between valid signal bandwidth of the baseband signal and the passband bandwidth of the filter and a different location relationship between a valid signal and an invalid signal in the baseband signal lead to a different involved filtering process. In this application, the valid signal bandwidth of the baseband signal is bandwidth of the valid signal in the baseband signal. A case in which the baseband signal is filtered to obtain the passband signal is specifically described below.

Figure 10A:
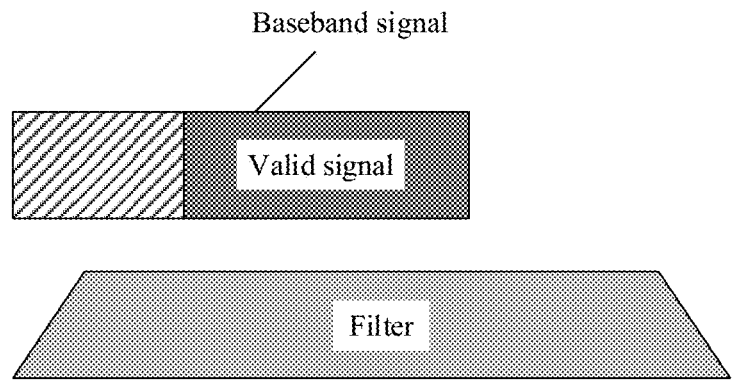
FIG. 10A to FIG. 10D are several schematic diagrams of a baseband signal according to an embodiment of this application.

Specifically, the baseband signal may have the following possible cases:

1. The valid signal bandwidth of the baseband signal is less than the passband bandwidth of the filter, there is a signal that needs to be suppressed on one side of the valid signal, and there is no signal that needs to be suppressed on the other side, as shown in FIG. 10A.

In this case, the baseband signal may be filtered with reference to the foregoing embodiment corresponding to FIG. 3. The baseband signal that includes only the first valid signal band and the first to-be-suppressed signal band is the baseband signal, and the first valid signal band is the valid signal in the baseband signal, in other words, the valid signal bandwidth of the baseband signal is equal to bandwidth of the first valid signal band, and the first to-be-suppressed signal band is an invalid signal in the baseband signal, in other words, a signal that needs to be suppressed.

Specifically, when the first to-be-suppressed signal band is on a left side of the first valid signal band in the first signal, if the filter is a low-pass filter, F3 is equal to 0, in other words, the frequency of the first side frequency point is equal to 0; if the filter is a band-pass filter, F3 is equal to a first cut-off frequency of the filter, in other words, the frequency of the first side frequency point is equal to the first cut-off frequency of the filter, the band-pass filter corresponds to two cut-off frequencies, and the first cut-off frequency is a smaller one of the two cut-off frequencies; and if the filter is a high-pass filter, F3 is equal to a cut-off frequency of the filter, in other words, the frequency of the first side frequency point is equal to the cut-off frequency of the filter.

Specifically, when the first to-be-suppressed signal band is on a right side of the first valid signal band in the first signal, if the filter is a low-pass filter, F3 is equal to a cut-off frequency of the filter, in other words, the frequency of the first side frequency point is equal to the cut-off frequency of the filter; if the filter is a band-pass filter, F3 is equal to a second cut-off frequency of the filter, in other words, the frequency of the first side frequency point is equal to the second cut-off frequency of the filter, the band-pass filter corresponds to two cut-off frequencies, and the second cut-off frequency is a larger one of the two cut-off frequencies; and if the filter is a high-pass filter, F3 is equal to a sum of a cut-off frequency of the filter and the passband bandwidth of the filter, in other words, the frequency of the first side frequency point is equal to the sum of the cut-off frequency of the filter and the passband bandwidth of the filter.

Figure 10B:
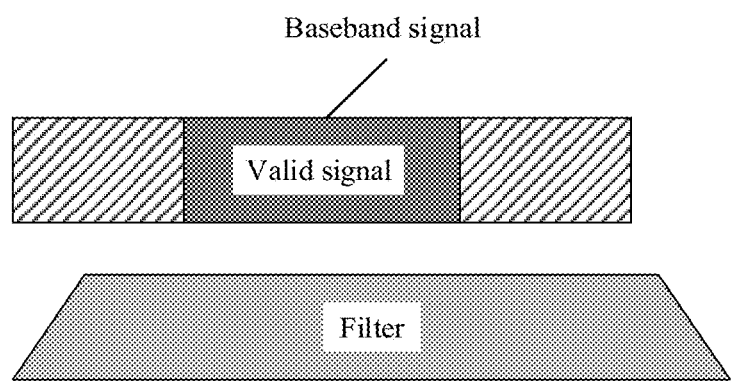

2. The valid signal bandwidth of the baseband signal is less than the passband bandwidth of the filter, and there is a signal that needs to be suppressed on either side of the valid signal, as shown in FIG. 10B.

In this case, the baseband signal may be filtered with reference to the foregoing embodiment corresponding to FIG. 5. The third signal is the baseband signal, and the first valid signal band is the valid signal in the baseband signal, in other words, the valid signal bandwidth of the baseband signal is equal to bandwidth of the first valid signal band, and the first to-be-suppressed signal band and the second to-be-suppressed signal band are invalid signals in the baseband signal, in other words, signals that need to be suppressed.

Specifically, when the frequency of the second side frequency point is on a first side of the frequency of the third boundary point in frequency domain, a specific implementation of step S401 in the embodiment corresponding to FIG. 5 may be: performing spectrum shifting on the baseband signal along a first side of the baseband signal based on a first offset to obtain the fourth signal, where the first offset is calculated based on a first formula, and the first formula is:

$$O1 = \begin{cases} \left| f0 - \frac{A}{2} - F1 \right|, f1 > f2 \\ \left| f0 + \frac{A}{2} - F2 \right|, f1 < f2 \end{cases},$$

where O1 is the first offset, f0 is a frequency of a center frequency point of the valid signal in the baseband signal, A is the valid signal bandwidth of the baseband signal, F1 is a frequency of a left side frequency point of the filter, F2 is a frequency of a right side frequency point of the filter, f1 is a frequency of the first boundary point, and f2 is a frequency of the third boundary point. Herein, the first side may be a left side or a right side. If f0−A/2>F1 or f0+A/2>F2, the first side is the left side; and if f0−A/2<F1 or f0+A/2<F2, the first side is the right side.

Specifically, when the frequency of the first side frequency point is on a second side of the frequency of the first boundary point in frequency domain, a specific implementation of step S403 in the embodiment corresponding to FIG. 5 may be: performing spectrum shifting on the first signal along a second side of the first signal based on a second offset to obtain the second signal, where the second offset is calculated based on a second formula, the second formula is O2=|B−A|, O2 is the second offset, and B is the passband bandwidth of the filter. The second side may be a left side, or may be a right side. If f1>f2, the second side is the right side; and if f1<f2, the second side is the left side.

Figure 10C:
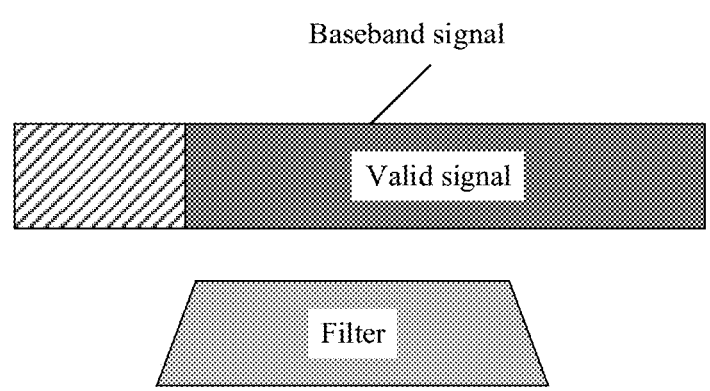

3. The valid signal bandwidth of the baseband signal is greater than the passband bandwidth of the filter, and there is a signal that needs to be suppressed on one side of the valid signal, as shown in FIG. 10C.

In this case, the baseband signal may be filtered with reference to the foregoing embodiment corresponding to FIG. 7A and FIG. 7B. The fifth signal is the baseband signal, and the third valid signal band is the valid signal in the baseband signal, in other words, the valid signal bandwidth of the baseband signal is equal to bandwidth of the third valid signal band, and the third to-be-suppressed signal band is an invalid signal in the baseband signal, in other words, a signal that needs to be suppressed.

Specifically, when the third to-be-suppressed signal band is on a left side of the sixth boundary point in the $(n-i)^{th}$ signal, and the frequency of the third side frequency point is on a third side of the frequency corresponding to the fifth boundary point in the $(n-i)^{th}$ signal in frequency domain, a specific implementation of step S502 in the foregoing embodiment corresponding to FIG. 7A and FIG. 7B may be: performing spectrum shifting on the $(n-i)^{th}$ signal along a third side of the $(n-i)^{th}$ signal based on a third offset to obtain the $(n+1)^{th}$ signal, where the third offset is calculated based on a third formula, and the third formula is:

$$O3 = \begin{cases} \left| f0 - \frac{A}{2} + (n-1) \times B - F1 \right|, (n-i) = 1 \\ (i+1) \times B, (n-i) > 1 \end{cases},$$

where O3 is the third offset, f0 is a frequency of a center frequency point of the valid signal in the baseband signal, A is the valid signal bandwidth of the baseband signal, and F1 is a frequency of a left side frequency point of the filter. Herein, the third side may be a left side or a right side. Whether the third side is specifically the left side or the right side depends on a value relationship between the frequency of the fifth boundary point in the $(n-i)^{th}$ signal and F1. If the frequency of the fifth boundary point in the $(n-i)^{th}$ signal is greater than F1, the third side is the left side, and if the frequency of the fifth boundary point in the $(n-i)^{th}$ signal is less than F1, the third side is the right side.

Specifically, when the third to-be-suppressed signal band is on a left side of the sixth boundary point in the $(n-i)^{th}$ signal, and the frequency of the first side frequency point is on a second side of the first boundary point in frequency domain, a specific implementation of step S508 in the foregoing embodiment corresponding to FIG. 7A and FIG. 7B may be: performing spectrum shifting on the first signal along a second side of the first signal based on an eleventh offset to obtain the second signal, where the eleventh offset is calculated based on an eleventh formula, and the eleventh formula is:

$$O11 = \begin{cases} \left|f0 - \frac{A}{2} + (n-1) \times B - F1\right|, (n-i) = 1 \\ (i+1) \times B, (n-i) > 1 \end{cases}$$

where O11 is the eleventh offset. Herein, the second side may be a left side or a right side. Whether the second side is specifically the left side or the right side depends on a value relationship between the frequency of the first boundary point in the first signal and F1. If the frequency of the first boundary point in the first signal is greater than F1, the second side is the left side, and if the frequency of the second boundary point in the first signal is less than F1, the second side is the right side.

Specifically, when the third to-be-suppressed signal band is on a right side of the sixth boundary point in the $(n-i)^{th}$ signal, and the frequency of the first side frequency point is on a frequency corresponding to the fifth boundary point in the $(n-i)^{th}$ signal in frequency domain, a specific implementation of step S502 in the foregoing embodiment corresponding to FIG. 7A and FIG. 7B may be: performing spectrum shifting on the $(n-i)^{th}$ signal along a third side of the $(n-i)^{th}$ signal based on a sixth offset to obtain the $(n+1)^{th}$ signal, where the sixth offset is calculated based on a sixth formula, and the sixth formula is:

$$O6 = \begin{cases} \left|f0 + \frac{A}{2} - (n-1) \times B - F2\right|, (n-i) = 1 \\ (i+1) \times B, (n-i) > 1 \end{cases}$$

where O6 is the sixth offset, f0 is a frequency of a center frequency point of the valid signal in the baseband signal, A is the valid signal bandwidth of the baseband signal, and F2 is a frequency of a right side frequency point of the filter. Herein, the third side may be a left side or a right side. Whether the third side is specifically the left side or the right side depends on a value relationship between the frequency of the fifth boundary point in the $(n-i)^{th}$ signal and F2. If the frequency of the fifth boundary point in the $(n-i)^{th}$ signal is greater than F2, the third side is the left side, and if the frequency of the fifth boundary point in the $(n-i)^{th}$ signal is less than F2, the third side is the right side.

Specifically, when the third to-be-suppressed signal band is on a right side of the sixth boundary point in the $(n-i)^{th}$ signal, and the frequency of the first side frequency point is on a second side of the first boundary point in frequency domain, a specific implementation of step S508 in the foregoing embodiment corresponding to FIG. 7A and FIG. 7B may be: performing spectrum shifting on the first signal along a second side of the first signal based on a twelfth offset to obtain the second signal, where the twelfth offset is calculated based on a twelfth formula, and the twelfth formula is:

$$O12 = \begin{cases} \left|f0 + \frac{A}{2} - (n-1) \times B - F2\right|, (n-i) = 1 \\ (i+1) \times B, (n-i) > 1 \end{cases}$$

where O12 is the twelfth offset.

Herein, the second side may be a left side or a right side. Whether the second side is specifically the left side or the right side depends on a value relationship between the frequency of the first boundary point in the first signal and F1. If the frequency of the first boundary point in the first signal is greater than F1, the second side is the left side, and if the frequency of the second boundary point in the first signal is less than F1, the second side is the right side.

Figure 10D:
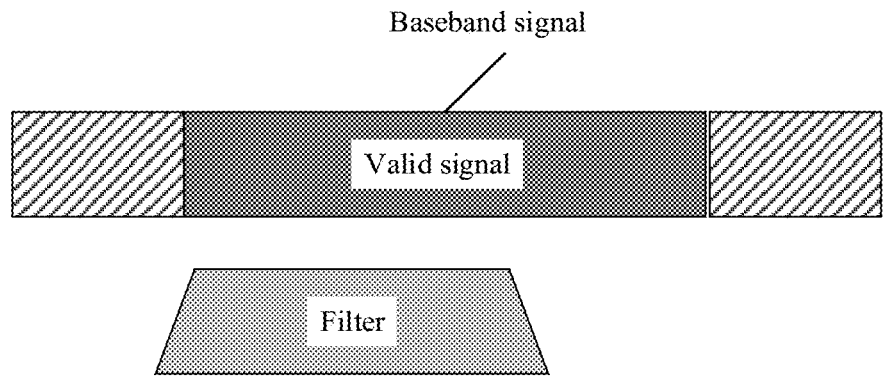

4. The valid signal bandwidth of the baseband signal is greater than the passband bandwidth of the filter, and there is a signal that needs to be suppressed on either side of the valid signal, as shown in FIG. 10D.

In this case, the baseband signal may be filtered with reference to the foregoing embodiment corresponding to FIG. 7A and FIG. 7B. The fifth signal is the baseband signal, and the third valid signal band is the valid signal in the baseband signal, in other words, the valid signal bandwidth of the baseband signal is equal to bandwidth of the third valid signal band, and the third to-be-suppressed signal band and the fourth to-be-suppressed signal band are invalid signals in the baseband signal, in other words, signals that need to be suppressed.

Specifically, when the third to-be-suppressed signal band is on a left side of the sixth boundary point in the $(n-i)^{th}$ signal, and the frequency of the third side frequency point is on a frequency corresponding to the fifth boundary point in the $(n-i)^{th}$ signal in frequency domain, a specific implementation of step S502 in the foregoing embodiment corresponding to FIG. 7A and FIG. 7B may be: performing spectrum shifting on the $(n-i)^{th}$ signal along a third side of the $(n-i)^{th}$ signal based on a third offset to obtain the $(n+1)^{th}$ signal, where the third offset is calculated based on a third formula, and the third formula is:

$$O3 = \begin{cases} \left|f0 - \frac{A}{2} + (n-1) \times B - F1\right|, (n-i) = 1 \\ (i+1) \times B, (n-i) > 1 \end{cases}$$

where O3 is the third offset, f0 is a frequency of a center frequency point of the valid signal in the baseband signal, A is the valid signal bandwidth of the baseband signal, and F1 is a frequency of a left side frequency point of the filter. Herein, the third side may be a left side or a right side. Whether the third side is specifically the left side or the right side depends on a value relationship between the frequency of the fifth boundary point in the $(n-i)^{th}$ signal and F1. If the frequency of the fifth boundary point in the $(n-i)^{th}$ signal is greater than F1, the third side is the left side, and if the frequency of the fifth boundary point in the $(n-i)^{th}$ signal is less than F1, the third side is the right side.

Specifically, when the third to-be-suppressed signal band is on a left side of the sixth boundary point in the $(n-i)^{th}$ signal, and the frequency of the second side frequency point is on a first side of the third boundary point in frequency domain, a specific implementation of step S505 in the foregoing embodiment corresponding to FIG. 7A and FIG. 7B may be: when it is determined that the fifth boundary point is the third boundary point, performing spectrum shifting on the third signal along a first side of the third signal based on a fourth offset to obtain the fourth signal, where the fourth offset is calculated based on a fourth formula, and the fourth formula is:

$$O4 = \begin{cases} \left|f0 - \frac{A}{2} + (n-1) \times B - F1\right|, (n-i) = 1 \\ (i+1) \times B, (n-i) > 1 \end{cases}$$

where O4 is the fourth offset. When it is determined that the eighth boundary point is the third boundary point, spectrum shifting is performed on the third signal along a first side of the third signal based on a fifth offset to obtain the fourth signal, where the fifth offset is calculated based on a fifth formula, and the fifth formula is:

$$O5 = \begin{cases} \left|f0 + \frac{A}{2} - F2\right|, (n-i) = 1 \\ A - (n-i-1) \times B, (n-i) > 1 \end{cases},$$

where O5 is the fifth offset. Herein, the first side may be a left side or a right side. Whether the first side is specifically the left side or the right side depends on a value relationship between the frequency of the third boundary point and F1 or F2. If the frequency of the third boundary point is greater than F1 or the frequency of the third boundary point is greater than F2, the first side is the left side, and if the frequency of the third boundary point is less than F1 or the frequency of the third boundary point is less than F2, the first side is the right side.

Specifically, when the third to-be-suppressed signal band is on a right side of the sixth boundary point in the $(n-i)^{th}$ signal, and the frequency of the third side frequency point is on a frequency corresponding to the fifth boundary point in the $(n-i)^{th}$ signal in frequency domain, a specific implementation of step S502 in the foregoing embodiment corresponding to FIG. 7A and FIG. 7B may be: performing spectrum shifting on the $(n-i)^{th}$ signal along a third side of the $(n-i)^{th}$ signal based on a sixth offset to obtain the $(n+1)^{th}$ signal, where the sixth offset is calculated based on a sixth formula, and the sixth formula is:

$$O6 = \begin{cases} \left|f0 + \frac{A}{2} - (n-1) \times B - F2\right|, (n-i) = 1 \\ (i+1) \times B, (n-i) > 1 \end{cases},$$

where O6 is the sixth offset, f0 is a frequency of a center frequency point of the valid signal in the baseband signal, A is the valid signal bandwidth of the baseband signal, and F2 is a frequency of a right side frequency point of the filter. Herein, the third side may be a left side or a right side. Whether the third side is specifically the left side or the right side depends on a value relationship between the frequency of the fifth boundary point in the $(n-i)^{th}$ signal and F2. If the frequency of the fifth boundary point in the $(n-i)^{th}$ signal is greater than F2, the third side is the left side, and if the frequency of the fifth boundary point in the $(n-i)^{th}$ signal is less than F2, the third side is the right side.

Specifically, when the third to-be-suppressed signal band is on a right side of the sixth boundary point in the $(n-i)^{th}$ signal, and the frequency of the second side frequency point is on a first side of the third boundary point in frequency domain, a specific implementation of step S505 in the foregoing embodiment corresponding to FIG. 7A and FIG. 7B may be: when it is determined that the fifth boundary point is the third boundary point, performing spectrum shifting on the third signal along a first side of the third signal based on a seventh offset to obtain the fourth signal, where the fourth offset is calculated based on a seventh formula, and the seventh formula is:

$$O7 = \begin{cases} \left|f0 + \frac{A}{2} - (n-1) \times B - F2\right|, (n-i) = 1 \\ (i+1) \times B, (n-i) > 1 \end{cases},$$

where O7 is the seventh offset. When it is determined that the eighth boundary point is the third boundary point, spectrum shifting is performed on the third signal along a first side of the third signal based on an eighth offset to obtain the fourth signal, where the eighth offset is calculated based on an eighth formula, and the eighth formula is:

$$O8 = \begin{cases} \left|f0 - \frac{A}{2} - F1\right|, (n-i) = 1 \\ A - (n-i-1) \times B, (n-i) > 1 \end{cases},$$

where O8 is the eighth offset, and F1 is a frequency of a left side frequency point of the filter. Herein, the first side may be a left side or a right side. Whether the first side is specifically the left side or the right side depends on a value relationship between the frequency of the third boundary point and F1 or F2. If the frequency of the third boundary point is greater than F1 or the frequency of the third boundary point is greater than F2, the first side is the left side, and if the frequency of the third boundary point is less than F1 or the frequency of the third boundary point is less than F2, the first side is the right side.

Specifically, when the frequency of the first side frequency point is on a second side of the frequency of the first boundary point in frequency domain, a specific implementation of step S508 in the embodiment corresponding to FIG. 7A and FIG. 7B may be: performing spectrum shifting on the first signal along a first side of the first signal based on a ninth offset to obtain the second signal, where the ninth offset is calculated based on a ninth formula, the ninth formula is O9=|n×B−A|, and O9 is the ninth offset. Herein, if the frequency of the first boundary point is greater than the frequency of the first side frequency point, the second side is the left side, and if the frequency of the first boundary point is less than the frequency of the first side frequency point, the second side is the right side.

Specifically, in the second case, the third case, and the fourth case, if the filter is a low-pass filter, F1 is equal to 0, and F2 is equal to a cut-off frequency of the filter; if the filter is a band-pass filter, F1 is equal to a first cut-off frequency of the filter, and F2 is equal to a second cut-off frequency of the filter; and if the filter is a high-pass filter, F1 is equal to a cut-off frequency of the filter, and F2 is equal to a sum of the cut-off frequency of the filter and the passband bandwidth of the filter.

In the foregoing solutions, any filter in a low-pass filter, a band-pass filter, or a high-pass filter that filters the baseband signal can have versatility, to obtain a passband signal of any baseband signal through filtering.

Optionally, after the passband signal of the baseband signal is obtained, spectrum shifting may be further performed on the passband signal based on a fourth frequency and a fifth frequency to obtain a radio frequency signal corresponding to the baseband signal. The fourth frequency is a frequency of a center frequency point of the radio frequency signal, and the fifth frequency is a frequency of a center frequency point of the passband signal. When the baseband signal is the first signal or the third signal, the passband signal is the first valid signal band, and when the baseband signal is the fifth signal, the passband signal is the third valid signal band. A signal to be sent to a communications channel can be obtained by shifting a center frequency point of the obtained passband signal to the center frequency point of the radio frequency signal.

It should be noted that the foregoing embodiments shown in FIG. 3, FIG. 5, FIG. 7A, and FIG. 7B are merely several specific implementations in which the filter obtains, through filtering in a manner of combining spectrum shifting and filtering, a valid signal band that needs to be obtained through filtering, and do not limit this application. In an optional implementation, for the valid signal band to be obtained through filtering, there may be more implementations of obtaining the valid signal band through filtering in the manner of combining spectrum shifting and filtering. In some possible implementations, the valid signal band to be obtained through filtering may further be considered as a combination of a plurality of valid signal segments whose bandwidth is less than or equal to the passband bandwidth of the filter, each valid signal segment is used as a signal to be obtained through filtering, a boundary point of each valid signal segment is aligned with the side frequency point of the filter, and then filtering is performed, to obtain each valid signal segment through filtering, and finally, the valid signal segments are spliced to obtain the valid signal band. Spectra of the plurality of valid signal segments may overlap each other or may not overlap each other, and the spectra of the plurality of valid signal segments are combined together to form a spectrum of the valid signal band to be obtained through filtering.

For example, for the valid signal band in the fifth signal S1 shown in FIG. 9A-1 and FIG. 9A-2, after the first second valid signal band, the second second valid signal band, the third second valid signal band, and a fourth second valid signal band are separately obtained through filtering, spectrum shifting may be further performed on any one of the signal S1 to the signal S5 in FIG. 9A-1 and FIG. 9A-2, so that the eighth boundary point p8 of the signal obtained through spectrum shifting is aligned with the right side frequency point of the filter, and then, the filter filters the signal obtained through shifting, to obtain the first valid signal band whose bandwidth is equal to the passband bandwidth of the filter, and signal splicing is performed on the first valid signal band, the first second valid signal band, the second second valid signal band, the third second valid signal band, and the fourth second valid signal band to obtain the valid signal band in the fifth signal S1. For another example, for the valid signal band in the signal s1 shown by U11 in FIG. 4, a demarcation point may be determined in the valid signal band. It is assumed that the demarcation point is a demarcation point A. The demarcation point A and a demarcation point p1 are used as boundary points of a left valid signal segment, and the demarcation point A and a right boundary point of the signal s1 are used as boundary points of a right valid signal segment. Then, spectrum shifting is performed on the signal s1, so that the demarcation point A of the signal s1 is aligned with the left side frequency point of the filter to obtain a signal 1, and the filter filters the signal 1 to obtain a filtered signal 1, and then spectrum shifting is performed on the filtered signal 1, so that a demarcation point p1 of the filtered signal 1 is aligned with the right side frequency point of the filter to obtain a signal 2; then, the filter filters the signal 2 to obtain a left valid signal segment; then, spectrum shifting is performed on the signal s1 or the signal 1, so that a right boundary point of the signal s1 or the signal 1 is aligned with the right side frequency point of the filter to obtain a signal 3, and then the filter filters the signal 3 to obtain a filtered signal 2, and then spectrum shifting is performed on the filtered signal 2, so that a demarcation point A of the filtered signal 2 is aligned with the left side frequency point of the filter to obtain a signal 4, and then the filter filters the signal 4 to obtain a right valid signal segment. Finally, signal splicing is performed on the left valid signal segment and the right valid signal segment to obtain a valid signal segment in the signal s1. The descriptions herein do not constitute a limitation.

In conclusion, for a signal to be obtained through filtering, an implementation in which one or more valid signal bands whose bandwidth is less than the passband bandwidth of the filter are obtained through filtering by one filter in a manner of performing spectrum shifting once or performing a combination of spectrum shifting and filtering for a plurality of times, and obtains, based on the one or more valid signal bands through signal splicing, the signal to be obtained through filtering is within the protection scope of this application. Because examples cannot be provided exhaustively, in this application, only the foregoing descriptions are used as examples of this application.

The method in the embodiments of this application is described above, and an apparatus in the embodiments of this application is described below.

Figure 11:
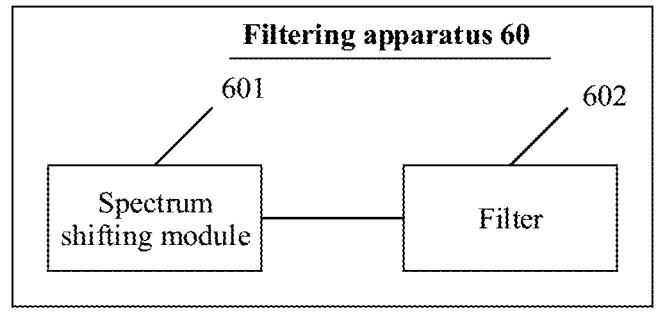
FIG. 11 is a schematic structural diagram of a filtering apparatus according to an embodiment of the present invention.

FIG. 11 is a schematic structural diagram of a filtering apparatus according to an embodiment of the present invention. The filtering apparatus may be implemented as the terminal device or the network device in the communications system shown in FIG. 1. As shown in the figure, a filtering apparatus 60 includes a spectrum shifting module 601 and a filter 602. An outband suppression degree of the filter 602 is higher than an outband suppression degree threshold.

The spectrum shifting module 601 is configured to perform spectrum shifting on a first signal to obtain a second signal, where the first signal includes a first valid signal band and a first to-be-suppressed signal band, a demarcation point of the first valid signal band and the first to-be-suppressed signal band in the first signal is a first boundary point, the first boundary point corresponds to a second boundary point in the second signal, a frequency of the second boundary point is equal to a frequency of a first side frequency point of the filter, and a frequency range corresponding to the first valid signal band in the second signal falls within a frequency range corresponding to a passband of the filter.

The filter 602 is configured to filter the second signal to obtain the first valid signal band.

Herein, for the first signal, the first valid signal band, the first boundary point, the second boundary point, the second signal, the first to-be-suppressed signal band, and the first side frequency point, refer to related descriptions in the foregoing method embodiments. Details are not described herein again.

The spectrum shifting module 601 may be configured to perform step S301 in the foregoing method embodiment corresponding to FIG. 3, step S401 and step S403 in the method embodiment corresponding to FIG. 5, and step S502, step S505, and step 508 in the method embodiment corresponding to FIG. 7A and FIG. 7B. For specific implementation in which the spectrum shifting module 601 performs step S301, or step S401 and step S403, or step S502, step S505, and step 508, refer to related descriptions in the foregoing method embodiments.

The filter 602 may be configured to perform step S302 in the foregoing method embodiment corresponding to FIG. 3, step S402 and step S404 in the method embodiment corresponding to FIG. 5, and step S503, step S506, and step 509 in the method embodiment corresponding to FIG. 7A and FIG. 7B. For specific implementation in which the filter performs step S303, or step S402 and step S404, or step S503, step S506, and step 509, refer to related descriptions in the foregoing method embodiments.

Figure 12:
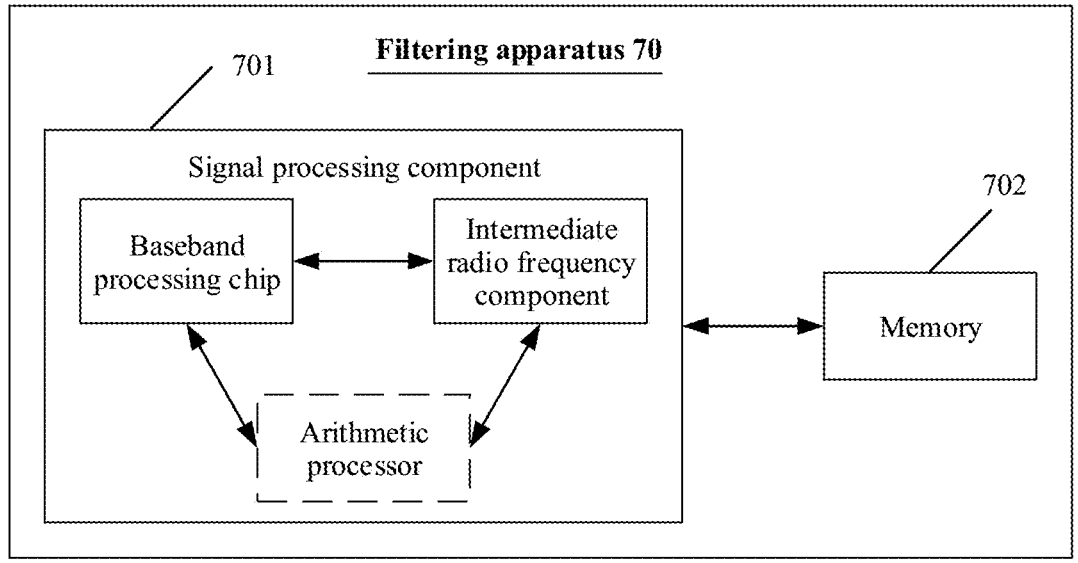
FIG. 12 is a structural block diagram of a filtering apparatus according to an embodiment of this application.

FIG. 12 is a structural block diagram of a filtering apparatus according to an embodiment of this application. The filtering apparatus may be implemented as the terminal device or the network device in the communications system shown in FIG. 1. As shown in FIG. 12, a filtering apparatus 70 may include a signal processing component 701 and a memory 702. The signal processing component 701 and the memory are connected by using one or more buses, or are connected in another manner.

The memory 702 is coupled to the signal processing component 701, and is configured to store various software programs and/or a plurality of groups of instructions. In specific implementation, the memory 702 may include a high-speed random access memory, and may also include a non-volatile memory. An operating system such as Android or Linux may be built in the memory 702. In some embodiments, the memory may be a memory inside the signal processing component. In this embodiment of this application, the memory 702 is configured to store an implementation program of the filtering method provided in the method embodiments of this application. For implementation of the filtering method provided in this application, refer to the foregoing embodiments. In an optional embodiment, the memory may store an offset, a cut-off frequency of a filter, a calculation formula of the offset, passband bandwidth of the filter, and the like. For the offset, the cut-off frequency of the filter, the passband bandwidth of the filter, and the calculation formula of the offset in this application, refer to the foregoing method embodiments.

The signal processing component 701 includes a baseband processing chip and an intermediate radio frequency component. The baseband processing chip is configured to process a baseband signal, for example, generate, for the filtering apparatus, a baseband signal to be sent to another communications device, or is configured to decode a baseband signal received by the filtering apparatus. In this embodiment of this application, the baseband processing chip is configured to perform spectrum shifting on the baseband signal, so that the baseband signal meets a filtering requirement. For a manner in which the baseband processing chip performs spectrum shifting on the baseband signal to enable the baseband signal to meet the filtering requirement, refer to the foregoing method embodiments. The intermediate radio frequency component is configured to process a signal related to a radio frequency. The intermediate radio frequency component may include elements such as a filter, an amplifier, and a frequency converter, and the filter may be one or more of a high-pass filter, a low-pass filter, a band-pass filter, or a band-stop filter. In this embodiment of this application, the intermediate radio frequency component is configured to filter a signal obtained through spectrum shifting. The intermediate radio frequency component may be further configured to perform spectrum shifting on a signal that is not a baseband signal, for example, perform spectrum shifting on a signal obtained by the filter through filtering. For a manner in which the intermediate radio frequency component filters the signal obtained through spectrum shifting and the intermediate radio frequency component performs spectrum shifting on the signal that is not a baseband signal, refer to the foregoing method embodiments.

Optionally, the signal processing component 701 may further include an arithmetic processor. The arithmetic processor is configured to: determine each spectrum shifting direction based on the calculation formula of the offset stored in the memory, and calculate an offset corresponding to each time of spectrum shifting. For a specific implementation of determining each spectrum shifting direction based on the calculation formula of the offset and calculating the offset corresponding to each time of spectrum shifting, refer to the foregoing method embodiments.

It should be understood that the filtering apparatus 70 shown in FIG. 12 is merely an implementation of this application. In actual application, the filtering apparatus 70 may include more or fewer parts, and this is not limited in this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer instruction may be stored in a computer-readable storage medium, or may be transmitted by using the computer-readable storage medium. The computer-readable storage medium may be any usable medium accessible by a computer, or a data storage device, such as a server or a data center, integrating one or more usable media. The usable medium may be a semiconductor medium (such as an SSD) or the like.

A person of ordinary skill in the art may be aware that, in combination with the examples described in the embodiments disclosed in this application, modules and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It should be noted that "first", "second", "third", and the various numeric numbers involved in the embodiments of this application are merely distinguished for ease of description, and are not intended to limit the scope of the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A filtering method in a communications system, the communications system comprising first and second devices which communicate with each other, the method performed by the first device and comprising:

performing spectrum shifting on a first signal to obtain a second signal, wherein the first signal comprises a first valid signal band and a first to-be-suppressed signal band, a demarcation point of the first valid signal band and the first to-be-suppressed signal band in the first signal is a first boundary point, the first boundary point corresponds to a second boundary point in the second signal, a frequency of the second boundary point is equal to a frequency of a first side frequency point of a filter, and a frequency range corresponding to the first valid signal band in the second signal falls within a frequency range corresponding to a passband of the filter;

filtering the second signal by using the filter, to obtain the first valid signal band; and using the first valid signal band in communication with the second device, wherein the method further comprises:

using a fifth boundary point of an $(n-i)^{th}$ signal and a boundary point of the $(n-i)^{th}$ signal as boundary points of a first signal band;

when a bandwidth of a valid signal band in the first signal band is greater than a passband bandwidth of the filter,
performing spectrum shifting on the $(n-i)^{th}$ signal to obtain an $(n+1)^{th}$ signal, wherein the $(n-i)^{th}$ signal comprises a third to-be-suppressed signal band and a third valid signal band, the third to-be-suppressed signal band and the first signal band are separately on two sides of the fifth boundary point in the $(n-i)^{th}$ signal, a demarcation point of the third to-be-suppressed signal band and the third valid signal band in the $(n-i)^{th}$ signal is a sixth boundary point, a frequency interval between the fifth boundary point and the sixth boundary point is $(n-1) \times B$, B is the passband bandwidth of the filter, the fifth boundary point corresponds to a seventh boundary point in the $(n+1)^{th}$ signal, a frequency of the seventh boundary point is equal to a frequency of a third side frequency point of the filter, the third side frequency point is the first side frequency point or a second side frequency point of the filter, and the second side frequency point is not the first side frequency point, wherein n is a positive integer, i is any integer greater than or equal to 0 and less than n, and when a value of n is 1, the $(n-i)^{th}$ signal is a fifth signal, and filtering the $(n+1)^{th}$ signal by using the filter, to obtain an $n^{th}$ second valid signal band, and using (n+1) as n to perform the using the fifth boundary point of the $(n-i)^{th}$ signal and the boundary point of the $(n-i)^{th}$ signal as the boundary points of the first signal band; and after the filtering the second signal by using the filter, to obtain the first valid signal band,
determining the third valid signal band based on the first valid signal band and the second valid signal band.

2. The method according to claim 1, before the performing the spectrum shifting on the first signal to obtain the second signal, further comprising:

performing spectrum shifting on a third signal to obtain a fourth signal, wherein the third signal comprises a second to-be-suppressed signal band and the first signal, a demarcation point of the second to-be-suppressed signal band and the first signal in the third signal is a third boundary point, the third boundary point is a demarcation point of the second to-be-suppressed signal band and the first valid signal band, the third boundary point corresponds to a fourth boundary point in the fourth signal, and a frequency of the fourth boundary point is equal to a frequency of the second side frequency point of the filter; and filtering the fourth signal by using the filter, to obtain the first signal.

3. The method according to claim 2, wherein the third signal is a baseband signal, a valid signal bandwidth of the baseband signal is equal to a bandwidth of the first valid signal band, the frequency of the second side frequency point is on a first side of a first frequency in frequency domain, and the first frequency is a frequency of the third boundary point, and the performing the spectrum shifting on the third signal to obtain the fourth signal comprises:

performing spectrum shifting on the baseband signal along a first side of the baseband signal based on a first offset to obtain the fourth signal,
wherein the first offset is calculated based on a first formula, and the first formula is:

$$O1 = \begin{cases} \left| f0 - \frac{A}{2} - F1 \right|, f1 > f2 \\ \left| f0 + \frac{A}{2} - F2 \right|, f1 < f2 \end{cases},$$

wherein O1 is the first offset, f0 is a frequency of a center frequency point of a valid signal in the baseband signal, A is the valid signal bandwidth of the baseband signal, F1 is a frequency of a left side frequency point of the filter, F2 is a frequency of a right side frequency point of the filter, f1 is a frequency of the first boundary point, and f2 is the frequency of the third boundary point.

4. The method according to claim 3, wherein
the frequency of the first side frequency point is on a second side of a second frequency in the frequency domain, and the second frequency is the frequency of the first boundary point, and the performing the spectrum shifting on the first signal to obtain the second signal comprises:

performing spectrum shifting on the first signal along a second side of the first signal based on a second offset to obtain the second signal,
wherein the second offset is calculated based on a second formula, the second formula is O2=|B−A|, O2 is the second offset, and B is a passband bandwidth of the filter.

5. The method according to claim 2, wherein the method further comprises:

when the bandwidth of the valid signal band in the first signal band is less than or equal to the passband bandwidth of the filter,
when the $(n-i)^{th}$ signal further comprises a fourth to-be-suppressed signal band,
determining that the $(n-i)^{th}$ signal is the third signal,
determining that the fifth boundary point or an eighth boundary point is the third boundary point, and
performing the spectrum shifting on the third signal to obtain the fourth signal, wherein the fourth to-be-suppressed signal band and the third to-be-suppressed signal band are on two sides of the third valid signal band in the $(n-i)^{th}$ signal, and a demarcation point of the fourth to-be-suppressed signal band and the third to-be-suppressed signal in the $(n-i)^{th}$ signal is the eighth boundary point, and when the $(n-i)^{th}$ signal does not comprise the fourth to-be-suppressed signal band, determining that the $(n-i)^{th}$ signal is the first signal,
determining that the fifth boundary point is the first boundary point, and
performing the spectrum shifting on the first signal to obtain the second signal.

6. The method according to claim 5, wherein the determining the third valid signal band based on the first valid signal band and the second valid signal band comprises:
when the second valid signal band is not obtained, determining the first valid signal band as the third valid signal band, and
when the second valid signal band is obtained, performing signal splicing on the first valid signal band and the second valid signal band to obtain the third valid signal band.

7. The method according to claim 5, wherein
the fifth signal is a baseband signal, the third to-be-suppressed signal band is on a left side of the sixth boundary point in the $(n-i)^{th}$ signal, the frequency of the third side frequency point is on a third side of a third frequency in frequency domain, and the third frequency is a frequency corresponding to the fifth boundary point in the $(n-i)^{th}$ signal, and
the performing the spectrum shifting on the $(n-i)^{th}$ signal to obtain the $(n+1)^{th}$ signal comprises:
performing spectrum shifting on the $(n-i)^{th}$ signal along a third side of the $(n-i)^{th}$ signal based on a third offset to obtain the $(n+1)^{th}$ signal,
wherein the third offset is calculated based on a third formula, and the third formula is:

$$O3 = \begin{cases} \left| f0 - \frac{A}{2} + (n-1) \times B - F1 \right|, (n-i) = 1 \\ (i+1) \times B, (n-i) > 1 \end{cases},$$

wherein O3 is the third offset, f0 is a frequency of a center frequency point of a valid signal in the baseband signal, A is a valid signal bandwidth of the baseband signal, and F1 is a frequency of a left side frequency point of the filter.

8. An apparatus in a communications system, the apparatus comprising:
at least one processor configured to perform operations comprising:
performing spectrum shifting on a first signal to obtain a second signal, wherein the first signal comprises a first valid signal band and a first to-be-suppressed signal band, a demarcation point of the first valid signal band and the first to-be-suppressed signal band in the first signal is a first boundary point, the first boundary point corresponds to a second boundary point in the second signal, a frequency of the second boundary point is equal to a frequency of a first side frequency point of a filter, and a frequency range corresponding to the first valid signal band in the second signal falls within a frequency range corresponding to a passband of the filter;
filtering the second signal by using the filter, to obtain the first valid signal band; and
causing the apparatus to use the first valid signal band in communication with another apparatus in the communications system
wherein before the performing the spectrum shifting on the first signal to obtain the second signal, the operations further comprise:
performing spectrum shifting on a third signal to obtain a fourth signal, wherein the third signal comprises a second to-be-suppressed signal band and the first signal, a demarcation point of the second to-be-suppressed signal band and the first signal in the third signal is a third boundary point, the third boundary point is a demarcation point of the second to-be-suppressed signal band and the first valid signal band, the third boundary point corresponds to a fourth boundary point in the fourth signal, a frequency of the fourth boundary point is equal to a frequency of a second side frequency point of the filter, and the second side frequency point is not the first side frequency point; and
filtering the fourth signal by using the filter, to obtain the first signal, and
the operations further comprise:
using a fifth boundary point of an $(n-i)^{th}$ signal and a boundary point of the $(n-i)^{th}$ signal as boundary points of a first signal band;
when a bandwidth of a valid signal band in the first signal band is greater than a passband bandwidth of the filter,
performing spectrum shifting on the $(n-i)^{th}$ signal to obtain an $(n+1)^{th}$ signal, wherein the $(n-i)^{th}$ signal comprises a third to-be-suppressed signal band and a third valid signal band, the third to-be-suppressed signal band and the first signal band are separately on two sides of the fifth boundary point in the $(n-i)^{th}$ signal, a demarcation point of the third to-be-suppressed signal band and the third valid signal band in the $(n-i)^{th}$ signal is a sixth boundary point, a frequency interval between the fifth boundary point and the sixth boundary point is $(n-1) \times B$, B is the passband bandwidth of the filter, the fifth boundary point corresponds to a seventh boundary point in the $(n+1)^{th}$ signal, a frequency of the seventh boundary point is equal to a frequency of a third side frequency point of the filter, and the third side frequency point is the first side frequency point or the second side frequency point, wherein n is a positive integer, i is any integer greater than or equal to 0 and less than n, and when a value of n is 1, the $(n-i)^{th}$ signal is a fifth signal, and
filtering the $(n+1)^{th}$ signal by using the filter, to obtain an $n^{th}$ second valid signal band, and using (n+1) as n to perform the using the fifth boundary point of the $(n-i)^{th}$ signal and the boundary point of the $(n-i)^{th}$ signal as the boundary points of the first signal band;
when the bandwidth of the valid signal band in the first signal band is less than or equal to the passband bandwidth of the filter,
when the $(n-i)^{th}$ signal further comprises a fourth to-be-suppressed signal band,
determining that the $(n-i)^{th}$ signal is the third signal,
determining that the fifth boundary point or an eighth boundary point is the third boundary point, and
performing the spectrum shifting on the third signal to obtain the fourth signal, wherein the fourth to-be-suppressed signal band and the third to-be-suppressed signal band are on two sides of the third valid signal band in the $(n-i)^{th}$ signal, and a demarcation point of the fourth to-be-suppressed signal band and the third to-be-suppressed signal in the $(n-i)^{th}$ signal is the eighth boundary point, and when the $(n-i)^{th}$ signal does not comprise the fourth to-be-suppressed signal band,
determining that the $(n-i)^{th}$ signal is the first signal,
determining that the fifth boundary point is the first boundary point, and
performing the spectrum shifting on the first signal to obtain the second signal; and
after the filtering the second signal by using the filter, to obtain the first valid signal band,
determining the third valid signal band based on the first valid signal band and the second valid signal band.

9. The apparatus according to claim 8, wherein the third signal is a baseband signal, a valid signal bandwidth of the baseband signal is equal to a bandwidth of the first valid signal band, the frequency of the second side frequency point is on a first side of a first frequency in frequency domain, and the first frequency is a frequency of the third boundary point, and
the performing the spectrum shifting on the third signal to obtain the fourth signal comprises:
performing spectrum shifting on the baseband signal along a first side of the baseband signal based on a first offset to obtain the fourth signal,
wherein the first offset is calculated based on a first formula, and the first formula is:

$$O1 = \begin{cases} \left|f0 - \frac{A}{2} - F1\right|, f1 > f2 \\ \left|f0 + \frac{A}{2} - F2\right|, f1 < f2 \end{cases},$$

wherein O1 is the first offset, f0 is a frequency of a center frequency point of a valid signal in the baseband signal, A is the valid signal bandwidth of the baseband signal, F1 is a frequency of a left side frequency point of the filter, F2 is a frequency of a right side frequency point of the filter, f1 is a frequency of the first boundary point, and f2 is the frequency of the third boundary point.

10. The apparatus according to claim 9, wherein
the frequency of the first side frequency point is on a second side of a second frequency in the frequency domain, and the second frequency is the frequency of the first boundary point, and
the performing the spectrum shifting on the first signal to obtain the second signal comprises:
performing spectrum shifting on the first signal along a second side of the first signal based on a second offset to obtain the second signal,
wherein the second offset is calculated based on a second formula, the second formula is $O2=|B-A|$, O2 is the second offset, and B is a passband bandwidth of the filter.

11. The apparatus according to claim 8, wherein the determining the third valid signal band based on the first valid signal band and the second valid signal band comprises:
when the second valid signal band is not obtained, determining the first valid signal band as the third valid signal band, and when the second valid signal band is obtained, performing signal splicing on the first valid signal band and the second valid signal band to obtain the third valid signal band.

12. The apparatus according to claim 8, wherein
the fifth signal is a baseband signal, the third to-be-suppressed signal band is on a left side of the sixth boundary point in the $(n-i)^{th}$ signal, the frequency of the third side frequency point is on a third side of a third frequency in frequency domain, and the third frequency is a frequency corresponding to the fifth boundary point in the $(n-i)^{th}$ signal, and
the performing the spectrum shifting on the $(n-i)^{th}$ signal to obtain the $(n+1)^{th}$ signal comprises:
performing spectrum shifting on the $(n-i)^{th}$ signal along a third side of the $(n-i)^{th}$ signal based on a third offset to obtain the $(n+1)^{th}$ signal,
wherein the third offset is calculated based on a third formula, and the third formula is:

$$O3 = \begin{cases} \left|f0 - \frac{A}{2} + (n-1) \times B - F1\right|, (n-i) = 1 \\ (i+1) \times B, (n-i) > 1 \end{cases},$$

wherein O3 is the third offset, f0 is a frequency of a center frequency point of a valid signal in the baseband signal, A is a valid signal bandwidth of the baseband signal, and F1 is a frequency of a left side frequency point of the filter.

13. A non-transitory memory storage medium comprising computer-executable instructions that, when executed by an apparatus having a filter, cause the apparatus to carry out operations comprising:
performing spectrum shifting on a first signal to obtain a second signal, wherein the first signal comprises a first valid signal band and a first to-be-suppressed signal band, a demarcation point of the first valid signal band and the first to-be-suppressed signal band in the first signal is a first boundary point, the first boundary point corresponds to a second boundary point in the second signal, a frequency of the second boundary point is equal to a frequency of a first side frequency point of the filter, and a frequency range corresponding to the first valid signal band in the second signal falls within a frequency range corresponding to a passband of the filter;
filtering the second signal by using the filter, to obtain the first valid signal band; and
using the first valid signal band in communication with another apparatus in a communications system,
wherein
before the performing the spectrum shifting on the first signal to obtain the second signal, the operations further comprise:
performing spectrum shifting on a third signal to obtain a fourth signal, wherein the third signal comprises a second to-be-suppressed signal band and the first signal, a demarcation point of the second to-be-suppressed signal band and the first signal in the third signal is a third boundary point, the third boundary point is a demarcation point of the second to-be-suppressed signal band and the first valid signal band, the third boundary point corresponds to a fourth boundary point in the fourth signal, a frequency of the fourth boundary point is equal to a frequency of a second side frequency point of the filter, and the second side frequency point is not the first side frequency point; and filtering the fourth signal by using the filter, to obtain the first signal, the third signal is a baseband signal, a valid signal bandwidth of the baseband signal is equal to a bandwidth of the first valid signal band, the frequency of the second side frequency point is on a first side of a first frequency in frequency domain, and the first frequency is a frequency of the third boundary point, and the performing the spectrum shifting on the third signal to obtain the fourth signal comprises:

performing spectrum shifting on the baseband signal along a first side of the baseband signal based on a first offset to obtain the fourth signal, wherein the first offset is calculated based on a first formula, and the first formula is:

$$O1 = \begin{cases} \left|f0 - \frac{A}{2} - F1\right|, f1 > f2 \\ \left|f0 + \frac{A}{2} - F2\right|, f1 < f2 \end{cases},$$

wherein O1 is the first offset, f0 is a frequency of a center frequency point of a valid signal in the baseband signal, A is the valid signal bandwidth of the baseband signal, F1 is a frequency of a left side frequency point of the filter, F2 is a frequency of a right side frequency point of the filter, f1 is a frequency of the first boundary point, and f2 is the frequency of the third boundary point.

14. The non-transitory memory storage medium according to claim 13, wherein the frequency of the first side frequency point is on a second side of a second frequency in the frequency domain, and the second frequency is the frequency of the first boundary point; and the performing the spectrum shifting on the first signal to obtain the second signal comprises:

performing spectrum shifting on the first signal along a second side of the first signal based on a second offset to obtain the second signal, wherein the second offset is calculated based on a second formula, the second formula is O2=|B−A|, O2 is the second offset, and B is a passband bandwidth of the filter.

15. The non-transitory memory storage medium according to claim 13, the operations further comprising:

using a fifth boundary point of an $(n-i)^{th}$ signal and a boundary point of the $(n-i)^{th}$ signal as boundary points of a first signal band;

when a bandwidth of a valid signal band in the first signal band is greater than a passband bandwidth of the filter, performing spectrum shifting on the $(n-i)^{th}$ signal to obtain an $(n+1)^{th}$ signal, wherein the $(n-i)^{th}$ signal comprises a third to-be-suppressed signal band and a third valid signal band, the third to-be-suppressed signal band and the first signal band are separately on two sides of the fifth boundary point in the $(n-i)^{th}$ signal, a demarcation point of the third to-be-suppressed signal band and the third valid signal band in the $(n-i)^{th}$ signal is a sixth boundary point, a frequency interval between the fifth boundary point and the sixth boundary point is $(n-1)\times B$, B is the passband bandwidth of the filter, the fifth boundary point corresponds to a seventh boundary point in the $(n+1)^{th}$ signal, a frequency of the seventh boundary point is equal to a frequency of a third side frequency point of the filter, and the third side frequency point is the first side frequency point or the second side frequency point, wherein n is a positive integer, i is any integer greater than or equal to 0 and less than n, and when a value of n is 1, the $(n-i)^{th}$ signal is a fifth signal, and filtering the $(n+1)^{th}$ signal by using the filter, to obtain an $n^{th}$ second valid signal band, and using (n+1) as n to perform the using the fifth boundary point of the $(n-i)^{th}$ signal and the boundary point of the $(n-i)^{th}$ signal as the boundary points of the first signal band; and when the bandwidth of the valid signal band in the first signal band is less than or equal to the passband bandwidth of the filter, when the $(n-i)^{th}$ signal further comprises a fourth to-be-suppressed signal band, determining that the $(n-i)^{th}$ signal is the third signal, determining that the fifth boundary point or an eighth boundary point is the third boundary point, and performing the spectrum shifting on the third signal to obtain the fourth signal, wherein the fourth to-be-suppressed signal band and the third to-be-suppressed signal band are on two sides of the third valid signal band in the $(n-i)^{th}$ signal, and a demarcation point of the fourth to-be-suppressed signal band and the third to-be-suppressed signal in the $(n-i)^{th}$ signal is the eighth boundary point, and when the $(n-i)^{th}$ signal does not comprise the fourth to-be-suppressed signal band, determining that the $(n-i)^{th}$ signal is the first signal, determining that the fifth boundary point is the first boundary point, and performing the spectrum shifting on the first signal to obtain the second signal; and after the filtering the second signal by using the filter, to obtain the first valid signal band, determining the third valid signal band based on the first valid signal band and the second valid signal band.

16. The non-transitory memory storage medium according to claim 15, wherein the determining the third valid signal band based on the first valid signal band and the second valid signal band comprises:

when the second valid signal band is not obtained, determining the first valid signal band as the third valid signal band, and when the second valid signal band is obtained, performing signal splicing on the first valid signal band and the second valid signal band to obtain the third valid signal band.

* * * * *